(12) United States Patent
Åström et al.

(10) Patent No.: US 11,956,050 B2
(45) Date of Patent: *Apr. 9, 2024

(54) BEAM SELECTION FOR HIGH FREQUENCY WIRELESS COMMUNICATION NETWORK

(71) Applicant: Telefonaktiebolaget LM Ericsson (publ), Stockholm (SE)

(72) Inventors: Magnus Åström, Lund (SE); Joao Vieira, Hjärup (SE); Robert Baldemair, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/764,341

(22) PCT Filed: Oct. 2, 2019

(86) PCT No.: PCT/SE2019/050955
§ 371 (c)(1),
(2) Date: Mar. 28, 2022

(87) PCT Pub. No.: WO2021/066688
PCT Pub. Date: Apr. 8, 2021

(65) Prior Publication Data
US 2022/0345196 A1 Oct. 27, 2022

(51) Int. Cl.
*H04L 1/02* (2006.01)
*H04B 7/06* (2006.01)

(52) U.S. Cl.
CPC .......... *H04B 7/0695* (2013.01); *H04B 7/063* (2013.01)

(58) Field of Classification Search
CPC ... H04B 17/364; H04B 17/318; H04B 17/373
(Continued)

(56) References Cited

U.S. PATENT DOCUMENTS

| 10,841,024 | B1* | 11/2020 | Vieira | H04B 17/364 |
| 2016/0192329 | A1* | 6/2016 | Park | H04W 72/02 |
| | | | | 370/329 |
| 2021/0345281 | A1* | 11/2021 | Yang | H04W 56/0045 |

FOREIGN PATENT DOCUMENTS

WO 2020236058 A1 11/2020

OTHER PUBLICATIONS

International Search Report and Written Opinion dated Jun. 16, 2020 for International Application No. PCT/SE2019/050955 filed Oct. 2, 2019, consisting of 10 pages.

(Continued)

*Primary Examiner* — Khai Tran
(74) *Attorney, Agent, or Firm* — Christopher & Weisberg, P.A.

(57) ABSTRACT

There is disclosed a method of operating a radio node in a wireless communication network. The method includes obtaining delay characteristic information for a set of wireless devices, the delay characteristic information for each of the set of wireless devices pertaining to one or more signaling beams of a set of signaling beams, and communicating with subgroups of wireless devices of the set of wireless devices using signaling beams selected from the set of signaling beams based on the delay characteristic information. For each subgroup, a different selected signaling beam is used for communicating. The disclosure also pertains to related devices and methods.

20 Claims, 4 Drawing Sheets

(58) Field of Classification Search
USPC .................................. 375/267, 262, 260
See application file for complete search history.

(56) References Cited

OTHER PUBLICATIONS

Mukherjee et al. "Timing Advance Estimation and Beamforming of Random Access Response in Crowded TDD Massive MIMO Systems"; IEEE Transactions on Communications, vol. 67, No. 6, Jun. 2019, consisting of 16 pages.
3GPP RAN Workshop on 5G RWS-150025; Feasibility Study on 5G Small-cell Deployment with a Beam-domain Processed Large-scale Antenna Array in High-frequency Bands; Asustek, CCY and ITRI; National Chung Cheng University, Phoenix, USA, Sep. 17-18, 2015, consisting of 32 pages.
Jiang Jing et al.; User scheduling algorithm for mmWave FDMA Massive MU-MIMO system with hybrid beamforming; Signal Processing Systems, Nov. 21, 2016, consisting of 5 pages.
Wang et al. "An Overview of Enhanced Massive MIMO With Array Signal Processing Techniques" IEEE Journal of Selected Topics in Signal Processing, vol. 13, No. 5, Sep. 2019, consisting of 16 pages.

\* cited by examiner

BEAM SELECTION FOR HIGH FREQUENCY WIRELESS COMMUNICATION NETWORK

CROSS-REFERENCE TO RELATED APPLICATIONS

This application is a Submission Under 35 U.S.C. § 371 for U.S. National Stage Patent Application of International Application Number: PCT/SE2019/050955, filed Oct. 2, 2019 entitled "BEAM SELECTION FOR HIGH FREQUENCY WIRELESS COMMUNICATION NETWORK," the entirety of which is incorporated herein by reference.

TECHNICAL FIELD

This disclosure pertains to wireless communication technology, in particular for high frequencies.

BACKGROUND

For future wireless communication systems, use of higher frequencies are considered, which allow large bandwidths to be used for communication. However, the use of such higher frequencies brings new problems, e.g. regarding physical properties and timing.

SUMMARY

It is an object of this disclosure to provide improved approaches of handling wireless communication, in particular in regard to handling delay spread of signaling or channels and/or timing. The approaches are particularly suitable for millimeter wave communication, in particular for radio carrier frequencies around and/or above 52.6 GHz, which may be considered high radio frequencies and/or millimeter waves. The carrier frequency/ies may be between 52.6 and 140 GHz, e.g. with a lower border between 52.6, 55, 60, 71 GHz and/or a higher border between 71, 72, 90, 114, 140 GHz or higher, in particular between 55 and 90 GHz, or between 60 and 72 GHz. The carrier frequency may in particular refer to a center frequency or maximum frequency of the carrier. The radio nodes and/or network described herein may operate in wideband, e.g. with a carrier bandwidth of 1 GHz or more, or 2 GHz or more, or even larger. In some cases, operation may be based on an OFDM waveform or a SC-FDM waveform (e.g., downlink and/or uplink). However, operation based on a single carrier waveform, e.g. SC-FDE, may be considered for downlink and/or uplink. In general, different waveforms may be used for different communication directions. Communicating using or utilising a carrier and/or beam may correspond to operating using or utilising the carrier and/or beam, and/or may comprise transmitting on the carrier and/or beam and/or receiving on the carrier and/or beam.

The approaches are particularly advantageously implemented in a 5th Generation (5G) telecommunication network or 5G radio access technology or network (RAT/RAN), in particular according to 3GPP ($3^{rd}$ Generation Partnership Project, a standardisation organization). A suitable RAN may in particular be a RAN according to NR, for example release 15 or later, or LTE Evolution. However, the approaches may also be used with other RAT, for example future 5.5G or 6G systems or IEEE based systems.

There is disclosed a method of operating a radio node in a wireless communication network. The method comprises obtaining delay characteristic information for a set of wireless devices. The delay characteristic information for each of the set of wireless devices pertains to one or more signaling beams of a set of signaling beams. The method also comprises communicating with subgroups of wireless so devices of the set of wireless devices using signaling beams selected from the set of signaling beams based on the delay characteristic information, wherein for each subgroup, a different selected signaling beam is used for communicating.

There is also disclosed a radio node for a wireless communication network. The radio node is adapted for obtaining delay characteristic information for a set of wireless devices. The delay characteristic information for each of the set of wireless devices pertains to one or more signaling beams of a set of signaling beams. The radio node is also adapted for communicating with subgroups of wireless devices of the set of wireless devices using signaling beams selected from the set of signaling beams based on the delay characteristic information, wherein for each subgroup, a different selected signaling beam is used for communicating. The radio node may comprise, and/or be adapted for utilising, processing circuitry and/or radio circuitry for obtaining information and/or communicating.

The approaches described herein allow improved handling of beamforming, in particular allowing use of a low number of beams in high frequency systems.

Communicating may comprise transmitting and/or receiving. The set of signaling beams may correspondingly comprise and/or consist of transmission beams and/or reception beams. In general, a signaling beam used to communicate with a subgroup may be considered to cover all devices in the subgroup, and/or may be used to transmit to and/or receive from all the devices in the subgroup (wherein receiving may comprise monitoring for a transmission). A subgroup may comprise one or more devices; a subgroup may represent a subset of the set of devices. It may be considered that the set of wireless device is grouped into a plurality of subgroups, at least one or at least two of which may comprise more than one wireless device, e.g. at least 2, 4, 8 or 16 devices. In some cases, to each subgroup, there may be associated one signaling beam, e.g. only one signaling beam, in particular for each point in time or a time interval, e.g. a transmission time interval and/or slot or subframe or frame or subslot or symbol time interval. It may be considered that each wireless device is only associated to one subgroup (e.g., at each point in time and/or time interval). However, for some cases, e.g. in the context of MIMO and/or spatial diversity, a wireless device may be associated to more than one subgroup.

It may be considered that the selected signaling beams are selected based on a beam signaling characteristic, which may represent and/or indicate a signal strength and/or signal quality. The selection may be based on the beam having a threshold signal strength and/or quality, and/or the set of signaling beams may comprise only beam fulfilling a beam signaling characteristic criterion, e.g. corresponding to having at least a threshold signal quality and/or signal strength. Thus, additional criteria may be considered to select signaling beams. The beam signaling characteristic may be provide for each of the wireless devices per beam.

In general, the delay characteristic information may represent and/or indicate at least one of mean delay, delay spread, delay distribution, delay spread distribution, delay spread range, relative delay spread, energy distribution, power distribution, impulse response to received signaling. A distribution in this context may pertain to distribution in time.

It may be considered that the delay characteristic information and/or beam signaling characteristic is based on measurement performed on reference signaling associated to a reference beam corresponding to the signaling beam the delay characteristic pertains to. The reference beam may be in the communication direction as the signaling beam, or in some cases in the reverse, or a combination thereof. Accordingly, the measurements may be performed and reported on by the wireless device/s, or by the radio node itself.

In some variants, the selected signaling beams may be signaling beams from a no subset of the set of signaling beams fulfilling a delay characteristic criterion. The criterion may represent a limit and/or threshold delay and/or delay distribution, e.g. absolutely or relative to other devices and/or beams. Thus, beams with unsuitable delay characteristics (e.g., delay larger than cyclic prefix) may be excluded, improving overall signaling quality.

It may be considered that the number of subgroups may be smaller than the number of wireless devices in the set of wireless devices. In particular, subgroups may comprise more than one wireless device; however, in some cases, there may be one or more subgroups with one wireless device only, e.g. if a device (user) moves away from a clustered group or is in a secluded place.

In general, communicating may be based on setting one or more transmission parameters for each of the selected signaling beams. If the beams are reception beams, setting such parameters may comprise configuring and/or scheduling such parameters for transmission beams. A transmission parameter (or transmission parameters) may in particular comprise at least one of, or any combination of, cyclic prefix length, modulation order, code rate, numerology (e.g., subcarrier spacing and/or symbol time length). The transmission parameters for different beams may be different. For communicating with wireless devices in the same subgroup, the same transmission parameter or parameters may be used.

It may be considered that communicating using the selected signaling beam may comprise utilising a numerology and/or may be based on an OFDM and/or SC-FDM based waveform. Alternatively, or additionally, communicating may comprise utilising a waveform with cyclic prefix. Such types of waveforms are particularly suitable to handle large numbers of users/wireless devices.

It may generally be considered that the wireless devices are grouped (or subgrouped) into subgroups based on a delay criterion, e.g. a minimum and/or threshold delay characteristic, and/or minimum and/or threshold deviation of delay characteristic. The minimum delay characteristic may select a beam with the minimum total delay for all wireless devices in a subgroup, e.g. optionally considering threshold values and/or at least one beam signaling characteristics criterion. A deviation of a delay characteristic may pertain to wireless device in a subgroup having the delay characteristic within a common range and/or deviating from each other up to a value (e.g., a corresponding threshold). Thus, wireless devices of one subgroup may have common or similar delay characteristics.

In some variants, the subgroups of wireless devices may be based on beams assigned to wireless devices based on a delay characteristic criterion. Such assigning may represent a preselection of available beams for devices, e.g. such that each beam fulfils a delay criterion (e.g., maximum or threshold delay) for the device. For example, only beams may be considered for a wireless device that have a delay below a threshold value (e.g., related to and/or based on available cyclic prefix/es). Accordingly, subgrouping may associate wireless devices to subgroups/associated signaling beams with suitable characteristics, in particular such that a selected signaling beam is from the beams assigned as available to a device and/or each device in the subgroup.

It may in general be considered that transmission parameters for a selected signaling beam are the same for each wireless device in the subgroup, and/or that communicating with wireless devices of a subgroup utilising the same (selected) signaling beam, e.g. at each point in time or time interval, e.g. symbol time interval and/or transmission time interval (TTI) and/or subslot or slot or subframe or frame.

The signaling beams in the set of signaling beams may be predetermined and/or predefined, and/or time-dependent. The set may comprise a plurality of signaling beams available, e.g. to communicate with one specific target (e.g., another radio node or wireless device) or with a plurality of specific targets, and/or may correspond to beam/s switched or swept during a beam sweeping/switching operation, respectively to associated reference beams. The set of signaling beams may comprise a subset of reception beams and/or a subset of transmission beams. However, it may be considered that a signaling beam is associated to reception and transmission (by the same node), e.g. using the same or corresponding precoder and/or beam parameters. To each signaling beam there may be associated a corresponding partner beam associated to the communication partner (e.g., other radio node or wireless device). Selecting a signaling beam may comprise selecting a partner beam and/or a beam pair, and/or indicating to the partner the partner beam and/or beam pair, e.g. with dynamic and/or semi-static control signaling. In general, different sets of signaling beams and/or different selected signaling beams may be associated to different communication partners and/or targets, e.g. different wireless devices. Selecting a beam may be performed periodically, e.g. with periodic beam switching and/or sweeping, and/or aperiodically, e.g. if communication quality drops, e.g. signal quality drops below a signaling threshold, and/or based on signaling received from the communication partner, e.g. indicating the need for a new beam selection. In different selection processes, the same set of signaling beams or different sets may be used, e.g. based on the relative movement between the radio node and communication partner (e.g., the same if slow or stationary, different if quick (quick may mean speed larger than a threshold speed)), and/or based on the type of beam forming used (e.g., the same if precoder-based and/or digital, whereas analog beamforming or hybrid beamforming may allow more flexibility). In general, a signaling beam may be a beam carrying and/or intended for and/or used for transmitting and/or receiving data signaling, e.g. on an associated (physical) data channel or associated data channels, e.g. PDSCH and/or PUSCH.

It may be considered that the beam signaling characteristic represents and/or indicates a signal strength and/or signal quality. Such characteristics are reliably measurable and provide useful parameters to determine basic beam parameters.

The delay characteristic may represent and/or indicate at least one of mean delay, and/or delay spread, and/or delay distribution, and/or delay spread distribution, and/or delay spread range, and/or relative delay or delay spread, and/or energy distribution, and/or impulse response (to received signaling), e.g. pertaining to a received channel or signaling. The delay characteristic may in general be evaluated in comparison to a predefined or predetermined time characteristic of signaling to be used for communicating, e.g. a cyclic prefix or cyclic prefix length. Hence, timing aspects impacting short time scales associated with high frequencies/numerologies may be considered.

It may generally be considered that a beam signaling characteristic and/or delay characteristic is based on measurement, or measurements, performed on reference signaling associated to a reference beam corresponding to the signaling beam the beam signaling characteristic and/or the delay characteristic pertains to. The reference beam may be transmitted by the radio node, in which case the characteristics may for example be based on and/or correspond to characteristics indicated in one or more measurement reports provided by another radio node like a wireless device, which may perform measurement/s on the reference beam and/or reference signaling. The reference signaling may in particular be UE specific signaling, e.g. CSI-RS and/or tracking reference signaling (TRS) and/or phase tracking reference signaling (PTRS). Alternatively, or additionally, the reference beam may be received from another radio node, e.g. a wireless device. In this example, the measurement/s may be performed by the radio node selecting the signaling beam. The reference beam and/or reference signaling may be configured and/or scheduled by this radio node. Examples of received reference signaling comprise sounding reference signaling (SRS). Thus, well-known signaling (reference signaling) may be used for selecting the signaling beam.

A selected signaling beam may be a signaling beam from a subset of the set of signaling beams fulfilling a delay characteristic criterion. The delay characteristic criterion may pertain and/or correspond to a maximum value or threshold or mean value for the delay characteristic. The value or threshold may correspond to the signaling falling sufficiently within the cyclic prefix and/or may correspond to a maximum delay or a delay distribution. The selected signaling beam may be the beam from the subset with the best signal strength and/or signal quality and/or beam signaling characteristic, e.g. the largest corresponding parameter of signal strength and/or SINR/SNR/SIR or energy or power density (or smallest, e.g. in terms of error rate). This allows selecting a beam with good time behaviour, while still having a good signaling characteristic. If no beam fulfills the criterion, the beam with the overall largest or best beam signaling characteristic may be used. A delay characteristic criterion may correspond to and/or pertain to one or more of: a minimum delay or delay spread (e.g., the beam with minimum delay or delay spread is used or is selected from the beams below the threshold); and/or a minimum or threshold delay (e.g., based on the last significant measured sample/tap of the impulse response); and/or a maximum and/or threshold of energy and/or power, e.g. outside the cyclic prefix (e.g., absolute or relative to the total energy); and/or a relative energy and/or power distribution (e.g., ratio of energy and/or power outside the cyclic prefix to inside the cyclic prefix; in particular weighted, e.g. based on time, in particular such energy sampled later/further outside the cyclic prefix is weighed higher); and/or a signal quality cap (e.g., SINR or SNR cap/cutoff) based on the power delay profile (which may correspond to the squared absolute value of the impulse response); and/or a delay or delay spread of a number of the strongest (e.g., best signaling characteristic, like highest signal strength or quality) beams and/or of the beams fulfilling a beam signaling characteristic criterion and/or based on an average of such beams; and/or a mean delay or mean delay spread falling below a threshold or within a range.

In some variants, communicating using the selected signaling beam may comprise utilising a numerology and/or is based on an OFDM and/or SC-FDM based waveform. Such waveforms may utilise a cyclic prefix and/or benefit particularly from the described approaches.

Alternatively, or additionally, communicating comprises utilising a waveform with cyclic prefix. A delay characteristic criterion may in general be defined, and/or based on and/or in relation to, the cyclic prefix, e.g. cyclic prefix duration and/or location. The criterion may relate to the delay spread or delay spread distribution falling substantially into the cyclic prefix, e.g. at least to 50% or 75% or 90%. Thus, the impact of delays may be ameliorated.

A beam, or all beams, of the set of signaling beams may correspond to a reference beam; each signaling beam may correspond to a different reference beam.

Alternatively, or additionally, the beam signaling characteristic and delay characteristic associated to a signaling beam may be considered to be measured and/or estimated for a corresponding reference beam. A reference beam may be considered to correspond to a signaling beam if a characteristic of the reference beam is considered to be representative (enough for use) of the corresponding characteristic of the signaling beam, e.g. within an acceptable time delay and/or within a small enough deviation regarding beam angle and/or beam size or shape. Thus, the selection may be performed based on measurements on suitable reference beams.

It may be considered that a (selected) signaling beam of the set of signaling beams is produced by performing analog beamforming to provide the beam, e.g. a beam corresponding to a reference beam. Thus, signaling may be adapted, e.g. based on movement of the communication partner. A beam of the set of signaling beams may for example be produced by performing analog beamforming to provide a beam corresponding to a reference beam. This allows efficient postprocessing of a digitally formed beam, without requiring changes to a digital beamforming chain and/or without requiring changes to a standard defining beam forming precoders.

In general, a beam of the set of signaling beams may be produced by hybrid beamforming, and/or by digital beamforming, e.g. based on a precoder. This facilitates easy processing of beams, and/or limits the number of power amplifiers/ADC/DCA required for antenna arrangements. It may be considered that a beam of the set of signaling beams is produced by hybrid beamforming, e.g. by analog beamforming performed on a beam representation or beam formed based on digital beamforming.

In general, beam signaling characteristics and/or delay characteristics may be provided and/or indicate to the radio node with a measurement report, and/or it may determine, e.g. measure, them itself.

A reference beam may be a beam comprising and/or carrying reference signaling, based on which for example the set of beam signaling characteristics may be determined, e.g. measured and/or estimated. A signaling beam may comprise signaling like control signaling and/or data signaling and/or reference signaling. A reference beam may be transmitted by the radio node, in which case one or more beam signaling characteristics may be reported to it from a receiver, e.g. a wireless device. However, in some cases it may be received by the radio node from another radio node or wireless device. In this case, one or more beam signaling characteristics may be determined by the radio node. A signaling beam may be a transmission beam, or a reception beam. A set of signaling characteristics may comprise a plurality of subsets of beam signaling characteristics, each subset pertaining to a different reference beam. Thus, a reference beam may be associated to different beam signaling characteristics.

A beam signaling characteristic, respectively a set of such characteristics, may represent and/or indicate a signal strength and/or signal quality of a beam and/or be associated with received and/or measured signaling carried on a beam. Beam signaling characteristics and/or delay characteristics may in particular pertain to, and/or indicate, a number and/or list and/or order of beams with best (e.g., lowest mean delay and/or lowest spread/range) timing or delay spread, and/or of strongest and/or best quality beams, e.g. with associated delay spread.

A reference beam may in general be one of a set of reference beams, the set of reference beams being associated to the set of signaling beams. The sets being associated may refer to at least one beam of the first set being associated and/or corresponding to the second set (or vice versa), e.g. being based on it, for example by having the same analog or digital beamforming parameters and/or precoder and/or the same shape before analog beamforming, and/or being a modified form thereof, e.g. by performing additional analog beamforming. The set of signaling beams may be referred to as a first set of beams, a set of corresponding reference beams may be referred to as second set of beams. A reference beam may be considered to correspond to a signaling beam if a delay characteristic of the reference beam corresponds to and/or is indicative of a delay characteristic of the signaling beam, e.g. due to the beams having the same shape and/or form and/or spatial angular distribution and/or covering the same signaling paths (of a signal traveling via multiple paths) and/or be shifted in time and/or due to symmetry (e.g., an UL beam corresponding to a DL beam, for example one being the reverse to the other, e.g. in a beam pair).

In some variants, a reference beam and/or reference beams and/or reference signaling may correspond to and/or carry random access signaling, e.g. a random access preamble. Such a reference beam or signaling may be transmitted by another radio node. The signaling may indicate which beam is used for transmitting. Alternatively, the reference beams may be beams receiving the random access signaling. Random access signaling may be used for initial connection to the radio node and/or a cell provided by the radio node, and/or for reconnection. Utilising random access signaling facilitates quick and early beam selection. The random access signaling may be on a random access channel, e.g. based on broadcast information provided by the radio node (the radio node performing the beam selection), e.g. with synchronisation signaling (e.g., SSB block and/or associated thereto). The reference signaling may correspond to synchronisation signaling, e.g. transmitted by the radio node in a plurality of beams. The characteristics may be reported on by a node receiving the synchronisation signaling, e.g. in a random access process, e.g. a msg3 for contention resolution, which may be transmitted on a physical uplink shared channel based on a resource allocation provided by the radio node. It may generally be considered that a signaling beam of the set of signaling beams corresponds to a reference beam. The reference beam may allow processing to estimate channel and/or delay spread pertaining to the beam of the first set, e.g. allow compensating and/or optimizing the beam, for example by including additional beamforming processing to limit and/or eliminate sidelobe/s, for example by analog beamforming. A plurality or each of the signaling beams of the set of signaling beams may correspond to a different one of a set of reference beams.

A beam signaling characteristic may be based on measurement/s performed on reference signaling carried on the reference beam it pertains to. The measurement/s may be performed by the radio node, or another node or wireless device. The use of reference signaling allows improved accuracy and/or gauging of the measurements.

In general, communicating may comprise utilising a numerology and/or be based on an OFDM and/or SC-FDM based waveform. The numerology may determine the length of a symbol time interval and/or the duration of a cyclic prefix. The approaches described herein are particularly suitable to OFDM/SC-FDM, to ensure orthogonality, in particular subcarrier orthogonality, in corresponding systems, but may be used for other waveforms. Communicating may comprise utilising a waveform with cyclic prefix. The cyclic prefix may be based on a numerology, and may help keeping signaling orthogonal.

There is also described a program product comprising instructions causing processing circuitry to control and/or perform a method as described herein. Moreover, a carrier medium arrangement carrying and/or storing a program product as described herein is considered.

The radio node may comprise, and/or be adapted to utilise, processing circuitry and/or radio circuitry, in particular a transmitter and/or receiver and/or transceiver, for communicating and/or beamforming, e.g. to produce the signaling beam and/or one or more reference beams. The radio node may be a network node, or in some cases a wireless device, e.g. a terminal or UE. Communicating using a signaling beam or a set of signaling beams may comprise transmitting and/or receiving using the set of beams. A (signaling) beam of a set of (signaling) beams may be a transmission beam or a reception beam. A reception beam generally may correspond to a transmission beam, e.g. in shape and/or solid angle distribution, and vice versa. It may be considered that a signaling beam corresponds to a reference beam, e.g. in shape and/or precoding and/or digital beamforming; a signaling beam corresponding to a reference beam may be based on the reference beam, and may for example be produced by additional beamforming processing, e.g. analog beamforming on a digitally formed beam. In general, a set may comprise one or more than one elements. A delay characteristic and/or beam signaling characteristic pertaining to a signaling beam may be based on, and/or pertain to, and/or represent measurement and/or reference signaling on a reference beam corresponding to the signaling beam, e.g. in the same communication direction, or in reverse.

It should be noted that a discussion of a beam being further processed, e.g. by analog beamforming, refers to a representation of the beam, e.g. in a digital system. This may lead to a form of a transmission beam that is not identical to the digital representation, or to a digitally processed received beam not corresponding to the actually transmitted beam that was received. It should also be noted that for reception beam forming, analog beamforming may comprise or represent preprocessing before digital beamforming. Any reference to the characteristics of a received or transmitted beam may be considered to pertain to the signaling and/or signals carried by the beam.

A delay characteristic (which may correspond to delay spread information) and/or a measurement report may represent and/or indicate at least one of mean delay, and/or delay spread, and/or delay distribution, and/or delay spread distribution, and/or delay spread range, and/or relative delay spread, and/or energy (or power) distribution, and/or impulse response to received signaling, and/or the power delay profile of the received signals, and/or power delay profile related parameters of the received signal. A mean delay may represent the mean value and/or an averaged value of the delay spread, which may be weighted or unweighted. A distribution may be distribution over time/delay, e.g. of received power and/or energy of a signal. A range may indicate an interval of the delay spread distribution over time/delay, which may cover a predetermined percentage of the delay spread respective received energy or power, e.g. 50% or more, 75% or more, 90% or more, or 100%. A relative delay spread may indicate a relation to a threshold delay, e.g. of the mean delay, and/or a shift relative to an expected and/or configured timing, e.g. a timing at which the signaling would have been expected based on the scheduling, and/or a relation to a cyclic prefix duration (which may be considered on form of a threshold). Energy distribution or power distribution may pertain to the energy or power received over the time interval of the delay spread. A power delay profile may pertain to representations of the received signals, or the received signals energy/power, across time/delay. Power delay profile related parameters may pertain to metrics computed from the power delay profile. Different values and forms of delay spread information and/or report may be used, allowing a wide range of capabilities. The kind of information represented by a measurement report may be predefined, or be configured or configurable, e.g. with a measurement configuration and/or reference signaling configuration, in particular with higher layer signaling like RRC or MAC signaling and/or physical layer signaling like DCI signaling.

BRIEF DESCRIPTION OF THE DRAWINGS

The drawings are provided to illustrate concepts and approaches described herein, and are not intended to limit their scope. The drawings comprise.

DETAILED DESCRIPTION

Figure 1:
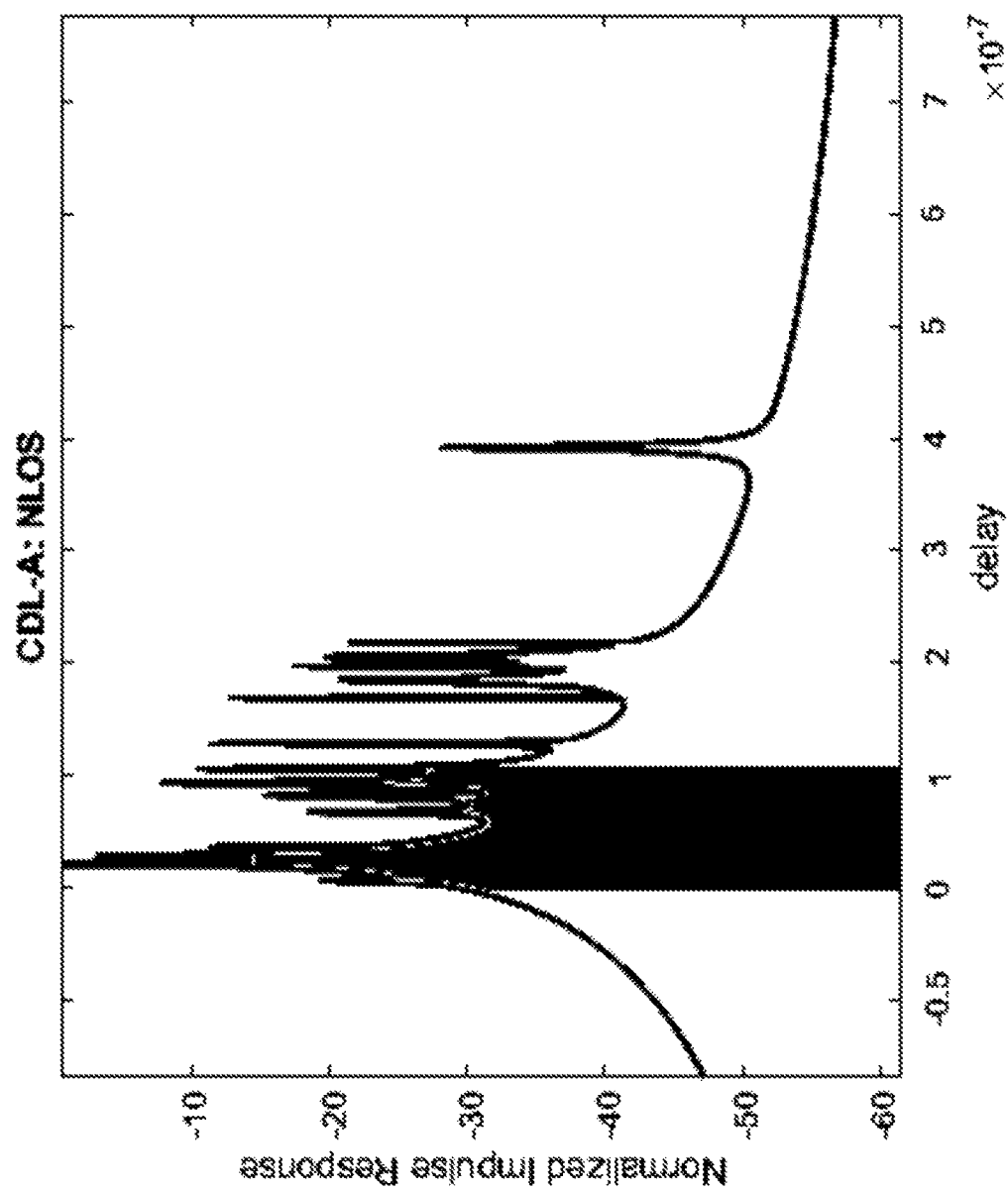
FIG. 1, showing an exemplary impulse response associated with a signal relative to a cyclic prefix.

In general, radio signaling propagating through a space in a propagation channel may undergo different effects distorting the signal. Some of these effects can lead to a signal being spread out in time and/or being delayed, e.g. delay dispersion, and/or multi-path, if a signal travels between a transmitter and receiver via multiple paths, which may represent different propagation channels with different effects on the signaling, which might add up for a receiver. This can lead to the signal being spread out over time, e.g. having increased or shifted (relative to a delay expected from pure travelling time of light across a path) mean or main delay and a large delay spread or delay distribution. In general, delay spread information may be considered to represent a time distribution of signaling, in particular of received signaling, e.g. pertaining to a channel to a receiver. Delay spread may be considered to be represented by delay spread information. A delay characteristic (also referred to as delay spread information) may (e.g., for a channel and/or for a receiver) indicate and/or represent a parametrisation of such a time distribution and/or delay and/or delay spread, in particular mean delay or main delay and/or a delay distribution. A delay distribution (also referred to as, or represented by, delay spread) may for example indicate in which delay interval around the mean delay or main delay a certain percentage of the signal or energy of the signal is distributed, e.g. one of, or more than, 50% or 75% or 90%. The delay spread or delay characteristic is associated to the impulse response of or to a propagation channel, a response or output a receiver provides to specific received signaling without other signaling interfering, and may be considered to represent or be indicative of the time dispersion of a signal and/or a channel. A delay spread may generally be considered to correspond a distribution over time, e.g. of energy and/or power of a signal, and/or may correspond to an impulse response. A mean delay may be determined based on the delay spread distribution.

In many wireless communication systems, in particular such based on OFDM waveform or SC-FDM waveforms, cyclic prefixes are used in signaling. A cyclic prefix is a repetition of the end of a signal added to the beginning of a signal. A cyclic prefix allows a receiver to be robust against time delays (e.g., from multiple sources or multiple-path effects) and/or loss of orthogonalisation of signals. However, if the delay spread of signaling (or a sufficiently large percentage thereof) is larger in time domain than the cyclic prefix, synchronisation and/or orthogonalisation properties may be lost. This is not a problem for most systems operating in carrier frequencies below, as the typical delay spreads are smaller than the cyclic prefixes used, even though cyclic prefixes typically are significantly shorter than a symbol time interval to limit signaling overhead. With the introduction of high carrier frequencies, increasingly larger bandwidths may be used for signaling. For example, in 5G, carrier bandwidths are usually limited to 100 MHz or several 100 MHz, whereas for high frequencies bandwidths of 1 GHz or 2 GHz or even more are considered. With increasing bandwidth and corresponding numerologies, the associated symbol time interval in a numerology will decrease, and, accordingly, cyclic prefixes will be shorter as well. Delay spread for signaling at these frequencies, at least for example for a beam and/or one path and/or for delay dispersion, may be independent or largely independent to the carrier frequency, or at least do not follow the timing of symbols and cyclic prefixes proportionally. Thus, for high carrier frequencies, e.g. mm-wave carrier frequencies, the delay spread of signaling may increasingly be larger than the cyclic prefix duration. This can lead to loss of orthogonality between subcarriers and/or temporal interference between adjacent OFDM symbols.

Figure 2:
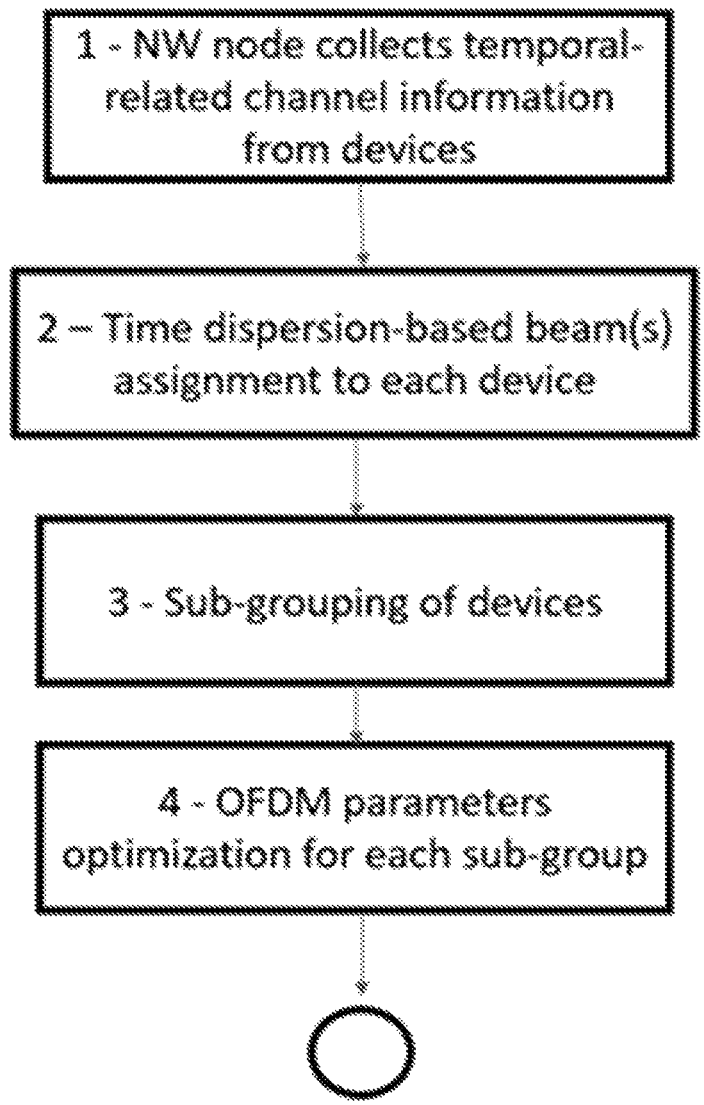
FIG. 2, showing a flow diagram of an exemplary method of selecting signaling beams.

FIG. 2 shows an example of a normalized impulse response covering several $10^{-7}$ s. The impulse response is measured approximately across 1.3 GHz of bandwidth. OFDM signaling operating with such bandwidth would yield 144-samples CP lengths of about $1 \times 10^{-7}$ s. As can be seen, the cyclic prefix in this example cover $1 \times 10^{-7}$ s, between 0 and 1 on the delay axis, which corresponds to a (144-samples) short cyclic prefix associated with a high frequency carrier/numerology. A significant part of the impulse response lies outside the cyclic prefix, which will lead to the above mentioned issues with the signaling. It should be noted that the cyclic prefix for NR systems currently typically is above 1 microsecond, which would cover the whole impulse response.

To ensure robustness in an OFDM link (or another link using CP), the time dispersion of the link's channel impulse response (CIR) needs to be smaller than the CP duration The CP durations in NR Rel. 15 are designed to work in bands up to 52.6 Ghz, e.g., in FR1 and FR2 (frequency ranges 1 and 2). However, in carrier frequencies above the 52.6 GHz range, wider bandwidths of one or more GHz will be used due to the large amount of available spectrum. This, in turn, results in much smaller (time) sampling rates. Given that similar CP efficiencies are used as in Rel. 15 (of about ~2048/(144+2048)), this will also reduce the effective CP duration (in seconds).

The time dispersion of channels is typically roughly independent of the carrier frequency, such that the required CP duration is independent of carrier frequency, for the same coverage. However, delay spread typically reduces with cell size and cell sizes tend to become smaller for higher frequencies, thus some delay spread reduction at higher frequencies can be expected due to smaller cells. As a result, it is desirable to optimize the CP duration for higher frequencies. Thus, the combination of a varying channel time dispersions and a reduced CP duration can be challenging aspect in mm-Wave bands, especially beyond 52.6 GHz.

There are, however, some system settings that can help lessening the time dispersion issue. For example, setting up the OFDM or SC-FDM modulation parameters in a suitable way may increase the system robustness in this sense. For example, using extended configurations CP length (e.g., 512 samples instead of 144), or smaller numerologies (if possible, e.g. form a phase noise robustness perspective), are viable possible options.

Another option is to use beamforming—a feature that beyond-FR2 systems likely have in order to obtain reasonable coverage. Beamforming allows to manipulate the spread of the resulting channel itself, since the resulting channel, sometimes called radio channel, is the composite of the propagation channel and the beamformer's effect. While the propagation channel is something that "we need to live with", the beam that is used is something that can be tuned by the system. The underlying principle of lowering the CIR time dispersion with the use of beamforming is to operate with a beam that illuminates only a small number of channel paths (often the strongest ones), where such paths arrive at similar delay instances. This will result in an impulse response with a few taps, all of them with similar delays, and therefore low dispersion. In practice, this may constitute the case of beamforming towards one, so-called, cluster of multipaths (e.g., caused by a surface of a building) and only receiving signals from such cluster. Since the desired time dispersion reduction is for the purpose of CP duration sufficiency, doing RX frequency domain beamforming (reception beamforming) does not help in this sense, since frequency domain beamforming occurs after the CP is removed. Hence, within this disclosure, beamforming may be considered to pertain to time domain Tx (transmission) and/or Rx (reception) beamforming, as beamforming type that is particularly useful to reduce the resulting channel's delay spread for safe CP removal (which may be performed during processing of received signaling). One instance of time domain beamforming is analog beamforming, which is particularly useful for system using frequencies beyond 52.6 Ghz (also referred to as high frequency systems or mm-wave systems herein). A beam formed by analog beamforming may be referred to as analog beam. However, in some approaches, digital or hybrid beamforming may be used.

Finding an appropriate system setting in mm-Wave systems, both in terms of beamforming and CP duration, may imply that some consideration on the resulting link's (or channel, representing the signaling connection conditions between TX and RX) time dispersion is taken into account during beam selection. In the single-user case, one is typically interested in finding an analog beam that can provide, enough link SINR, where the "I" results from the self-interference of having a too short CP compared to the resulting channel time dispersion. In a multi-user context, there are additional challenges. For example, it might not be optimal to serve each device user with its preferred analog beam, since each device may prefer a distinct NW node's (e.g. gNB's) analog beam, and thus only TDM user multiplexing is possible.

Thus, there is a need for approaches for multi-user beam assignment and/or corresponding respective CP configuration for high frequency/mm-wave communications, to provide resulting links (after beam assignment) that are robust against time dispersions.

There is for example described a procedure for beam/OFDM parameter configuration of Tx signals to subgroups of devices, where each subgroup of devices is served under the same beam and uses the same OFDM modulation parameters (and thus CP duration). This exemplary procedure may be performed by a radio node exemplified by a network node NW, and is shown in FIG. 2 comprising optional actions of 1. obtaining, e.g. collecting, a delay characteristics information, e.g. time dispersion information, of the channels between itself and a plurality of wireless devices or radio nodes, e.g. all the devices to be targeted with or for transmissions;
2. identifying a (small) number of potential signaling beams, which provide low time dispersion channels, and that may be used to serve each device;
3. performing beam/user assignment, where all users, which are served by the same beam, form a subgroup; this may be referred to as "subgrouping";
4. optionally choosing an OFDM parameterization, e.g. CP duration and/or numerology, for each subgroup of devices based on the time dispersion of the resulting channels. It should be noted that action 4 may be included into action 2 or 3, and/or be related to defining beams of the set of signaling beams.

In general, it may be considered suitably allocating and/or targeting multiple users in the same mm-wave beam. One possible scenario where such method is may be useful is in high density and high traffic small cells (e.g., soccer stadiums or concern halls, where users are very closely located and for example are consuming/producing video streams). The proposed procedure results in a choice of a relatively small set of beams which provide low overall delay dispersion of the resulting channels towards many devices. This in turn, may result in lower requirements for the CP duration, and thus higher efficiency, e.g. OFDM modulation efficiency.

At action 1, the NW node may obtain, e.g. collect and/or determine and/or measure and/or receive, time dispersion information of the channel between itself and the devices. The time dispersion information may representative of delay characteristic information. The delay characteristic information may indicate time dispersion for each of a plurality of wireless devices, e.g. for one or more beams (in particular, one or more beams for the same device; the information of different devices may pertain to the same set of subset of beams, e.g. signaling or reference beams). Based on this information, the NW node, at action 2, may assigns beams that may be used to serve each device at a later stage. Beam assignment may be such that the resulting channel (propagation+chosen beam) to each device has a low time dispersion. In addition to time dispersion, also link quality metrics (beam signaling characteristics, e.g. signal quality and/or signal strength) such as received power, noise, signal strength, SNR, SINR can be considered. In action 3, the NW may assign all devices into subgroups based on their resulting channel's time dispersion (subgrouping). Each subgroup may have similar delay dispersions (e.g., all being below a common threshold, or within a range or interval of time/delay dispersions), for example such that the OFDM modulation configuration (e.g. CP duration) fits all sub-group devices nicely. In the sub-grouping process, it can be considered to allow small beam adjustments to increase the number of devices using same transmission beam and thus reduce groups of beams, e.g. in terms of beam angle and/or shape and/or spatial angular extension. At action 4, the OFDM parameters (or SC-FDM or other transmission parameters, depending on waveform) pertaining to each subgroup of users may be configured (in particular, there may be one transmission parameter (OFDM/SCFDM) parameterization per subgroup), e.g. to provide enough CP duration robustness against the time dispersion of all devices channels pertaining that subgroup.

The actions are described in more detail in the following.

Action 1—The NW or network node obtains or collects temporal-related channel information from or for devices. The NW node obtains collects time dispersion information related to the channels associated with its beams and the devices (or information which allows deduction of such information). One option to obtain time dispersion information is via feedback reports (also referred to as channel reports) from each device. The reports can be constructed from measurements from each device, for example, from the outcome of a beam sweeping procedure from the NW node to the devices. The beams used during such a procedure may be considered reference beams. A channel report from a device may contain delay characteristic information like time dispersion information concerning the "best" NW node beams, e.g. with lowest dispersion and/or best beam signaling characteristic. For example, channel report may for example be generated as follows: The NW node may sound (transmit on) L of its beams. Each wireless device listens and reports the delay information of the "best" N of these L sounded beams (e.g., according to beam signaling characteristic, e.g. signal quality and/or signaling strength). If the device measures a given NW node beam in a number of its own beams (reception beams), then the device may register the delay information associated with the "best" beam pair (e.g., the current NW node beam and the "best" of its own beams). By doing so for each of the L NW node beams (or less, depending on whether it is able to receive all of the L beams; non-received beams may be reported on as not received, or dropped from the report, depending on N, which may be configured or configurable or predefined), the device may then include, in the report, the indexes of the "best" N NW node beams and their respective measured delay information values. If the device is later assigned in a given NW node beam, then the device may need to operate with the device beam (reception beam) associated with the reported information (in order to meet the reported time dispersion).

The term "best" beam (used in the previous paragraph) may be defined, e.g., in terms of beam signaling characteristic, e.g. classical RSS (Received Signal Strength), criteria. Here, the reports may contain the indexes of the beams with the largest RSS and also their associated time dispersion. Alternatively, "best" can also be defined in terms of the time dispersion related information that is being fed back (reported). In this case, the N best beams, which time dispersion information is being fed back, are the ones yielding the lowest time dispersion from the L sounded beams. It may also be a combination of the two (or the time dispersion related plus other signal strength related metrics as mentioned above) such that the best beams constrained with a certain maximum channel dispersion may be reported since different CP durations are likely to be defined in discrete steps. In general, each report may include beams with beam signaling characteristic(s) acceptable for the receiving device, e.g. above a threshold signaling strength and/or quality. Examples for delay metrics (delay characteristics) pertaining to the time dispersion of the impulse response that can be received via reports, are given below; delay characteristic information may pertain to any one or any combination thereof.

One important class of delay characteristic or time dispersion information comprises aspects concerning the spread of the impulse response of the resulting channel (e.g., propagation+analog beamformers). Examples of such spread pertain to and/or represent, e.g. the difference between the delay of the first significant CIR tap and the last significant CIR tap, and/or the normalized second order moment of the power delay profile (PDP) also known as root mean square (RMS) delay spread (DS), etc. Another class of time dispersion information concern aspects of the coherence bandwidth of the signal. This is because the coherence bandwidth is inversional proportional to the delay spread, since it the coherence bandwidth is the Fourier counterpart of the delay spread. In this sense, any related coherence bandwidth information on the measured channels also qualifies for the purpose of time dispersion reporting and/or as delay characteristic information. Examples, of such metrics are: coherence bandwidth of the channel (incl. beamforming) (i.e. maximum bandwidth satisfying a given correlation value), etc.

The term delay spread (DS) may be used to refer to any of such time dispersion metrics or delay characteristic information, for simplicity.

Another option to obtain time dispersion information (DS) is via measurements at the NW node side, from signals sent from the wireless devices. Some form of channel reciprocity or symmetry may be required that beams measured on correspond to signaling beams. Using such measurements, the NW node can estimate the characteristics and/or metrics (described above) with respect to each device.

A purpose of collecting DS information is to enable the NW (node) to make appropriate beam selection choices when serving the devices. Table 1 shows an example on how this DS information can be compiled.

TABLE 1

Example of the resulting channel DS reported by 4 users regarding 5 NW node Tx beams.

| Beams | Users | | | | |
| --- | --- | --- | --- | --- | --- |
| | 1 | 2 | 3 | 4 | 5 |
| 1 | 37 ns | 56 ns | | 95 ns | |
| 2 | 60 ns | 20 ns | | | 55 ns |
| 3 | 40 ns | 56 ns | | 38 ns | |
| 4 | 49 ns | 25 ns | 40 ns | | |

In this example, the DS of L=5 NW node beams was obtained (e.g., measured or received) across 4 users. For simplicity, it is assumed that each user reports the DS of its N=3 best associated NW node beams, but this number can be also vary per user. The tables entries crossed out concern beam/user combinations that were not included in the feedback report, e.g. because it was not received or to weakly received. If the "best" beam is a combination with signal strength, a user may also report fewer beams and omits those beams not fulfilling a minimum signal strength.

The Beams

In another embodiment, some reported beams that do not pass an external NW node criterium are not considered for further processing—and thus are not included in the table (e.g., not considered by the network node, or not reported on if the criterion is known to the wireless device). For example, if the report also includes other aspects of the reported beams, and some such aspects to not meet a certain minimum performance threshold, such as RSS, then their associated entries of table 1 may not be considered. For example, if all reported beams, except beams 2 and 4 for user 1, have an associated RSS value above a pre-defined threshold, then beams 2 and 4 for user 1 are excluded from the next beam assignment stage. With that, the table of possible beam choice becomes

TABLE 2

Filtered table 1 due to additional criterium.

| Users | Beams | | | | |
|---|---|---|---|---|---|
| | 1 | 2 | 3 | 4 | 5 |
| 1 | 37 ns | ~~56 ns~~ | | ~~95 ns~~ | |
| 2 | 60 ns | 20 ns | | | 55 ns |
| 3 | 40 ns | 56 ns | | 38 ns | |
| 4 | 49 ns | 25 ns | 40 ns | | |

In action 2, delay characteristic information-based beam assignment to each device may be performed. As shown in table 2, the channel information indicates the DS associated with one or more beams for a given device. In the case that there is only one beam DS information for a device, then the device may be served with this beam, the beam providing the shortest DS (e.g. user 1 can only be served by beam in table 2).

In the case that there are more than 1 possible beams per user, the NW node needs to select which beam/beams is/are used to serve each device. For example, under table 2's scenario, if user/beam selection was performed solely based on each user's DS preferred beam, then each user would be assigned a distinct beam (user 1 would be assigned beam 1, user 2 would be assigned beam 2, user 3 would be assigned beam 4, etc). However, given the analog beamforming structure at the NW node, only one beam can be used at a time, which implies strict TDM multiplexing between all devices. This can be problematic, especially when the number of devices and beams grows large. Thus, it may be considered to utilise beam selection criteria that find a reduced set of beams which can serve all users (with the possibility that multiple users share a beam, e.g. utilising frequency domain multiplexing, such that different parts of the spectrum are used for different wireless devices). Even if the NW or network node should be capable of transmitting or receiving a few simultaneous beams, the approaches described herein are still beneficial, as the number of users that can be served simultaneously is further increased (via the number of simultaneous beams—as in e.g. an hybrid beamforming system where the NW node can transmit simultaneous from more than one beam).

In one variant, the beam assignment may be done based of the maximum supportable DS value. It can be conducted in 3 sub-actions:
  a. A maximum DS threshold, $\in^{DS}$, may be set. This value may represent the maximum DS value that all users can accommodate;
  b. The smallest set of beams that guarantees a DS of $\in^{DS}$ to all users is found.
  c. Each user is assigned beam(s) that guarantee a DS of $\in^{DS}$ or less, from the set of beams found in b.

For example, if the maximum supportable DS value by all users is defined to $\in^{DS}$=50 ns, then the smallest set of beams that guarantee a 50 ns DS to all users in table 2 has size 2, and is made of beam 1 and beam 2. Then, from this set of beams, users and 3 are assigned beam 1, users 2 is assigned beam 2, and user 4 can be assigned beam 1 and/or 2. The bold entries in table 3 illustrate this setup for beam assignment. If a user is assigned more than one beam, the beams may be used for e.g., spatial diversity and/or multi-layer transmission.

TABLE 3

Beam selection results for setup of Table 2 with $\epsilon^{DS}$ = 50 ns.

| Users | Beams | | | | |
|---|---|---|---|---|---|
| | 1 | 2 | 3 | 4 | 5 |
| 1 | 37 ns | ~~56 ns~~ | | ~~95 ns~~ | |
| 2 | 60 ns | 20 ns | | | 55 ns |
| 3 | 40 ns | 56 ns | | 38 ns | |
| 4 | 49 ns | 25 ns | 40 ns | | |

In another example, if the maximum supportable DS value by all users is defined to $\in^{DS}$=65 ns, then all users are assigned beam 1, since this provides the smallest set of beams that can be used to guarantee the threshold.

In one example, the beam allocation/assignment process is depending on the amount of data awaiting each UE. If UE 2 has a lot of data and UEs 1, 3 and 4 have little data, beam 2 may be configured to solely handle UE2 whereas beam 1 may handle the remaining UEs. The amount of data may be based on a buffer status, e.g. at the network node, or for uplink transmission, based on scheduling request and/or buffer status reports received from the wireless devices.

Action 3 pertains to sub-grouping of devices. Once the beam assignment is done, the network may perform sub-grouping of devices (or include the assignment into the sub-grouping as a common action). A sub-group of devices may be defined as a set of wireless devices which will be served using the same transmission parameters, e.g. OFDM parameterization. For example, they may be served with the same CP length, subcarrier spacing, etc. All devices that belong to a subgroup may be served under the same beam. The motivation for this is twofold: 1) All devices within a beam are served under the same transmission parameters, e.g. OFDM modulation parameters, which makes it convenient for multiplexing purposes. In particular, devices belonging to different subgroups may be multiplexed in a TDM fashion (different analog beams), and devices belonging to the same subgroup may be multiplexed in an FDM fashion (e.g., due to the same OFDM parameterization per subgroup). Even devices belonging to the same subgroup can be served with TDM, e.g. if the same beam is used twice. 2) Devices belonging to the same beam are typically expected to have similar delay dispersion, and thus using the same CP duration for all subgroup devices is effective.

In one variant, sub-grouping may be performed according to the minimax principle, namely, minimizing w.r.t the largest device DS. This procedure can be carried out iteratively. For example, in an iterative step for the user (wireless device) associated with the current largest possible DS value is assigned the beam which minimizes its DS. Then, if the largest DS value (from all devices) is still associated with such user, the iteration stops (since that user is still associated with the largest DS and was already assigned a beam). If instead, the user associated with the largest possible DS is different, the same beam assignment procedure for such user may be repeated. The process is repeated until: 1) as mentioned before, the user currently associated with the largest DS value was already a beam, or 2) the user currently associated with the largest DS value has only one associated beam (e.g., user 3). Table 3 is used to provide an example for this procedure. Here, the bold entries represent the possible beam choices (resulting from action 2). First, the user associated with the current largest possible (below the threshold) DS value, namely, user 4 and 49 ns, is assigned beam 2 since it minimizes the DS between all possible beams associated with user 4. Now the DS associated with user 4 is 25 ns, and thus user 3 is the current user with the highest associated DS (40 ns). Since user 3 has only one associated beam, the iterative procedure stops. As a result, users 4 and 2 are associated with beam 2, and users 1 and 3 are associated with beam 1.

In another variant, sub-grouping may be performed such that the DS variation for all devices assigned to a subgroup is as small as possible. For example, in Table 3's case, subgroup #1 may include users 1 and 3 in beam 1, and subgroup #2 may include users 2 and 4 in beam 2. For the first subgroup, this gives a DS standard deviation of 6.2450 ns and for the second subgroup of 3.5 ns. This ensures that all devices in a subgroup yield similar DSs which is beneficial for CP configuration. Note that, in for exemplary table 3, this variant gives the same beam/user allocation as the previous variant, although this needs not to be necessarily always the case.

In a further variant, sub-grouping may be performed such that the total CP duration is minimized for a given number of available resources (beams). This criterion implies that overall overhead is minimized. Starting out with Table 1 (assuming Users↔Beams), that implies that User 1 and User 3 will use Beam 1, whereas User and User 4 will use Beam 2, for the case where two beams are to be allocated evenly among all users. The total CP duration for this case is 40 ns+25 ns=65 ns.

Action 4 pertains to transmission parameter optimization, e.g. OFDM modulation parameter optimization, for each sub-group. Each sub-group of users is served with its own transmission parameters. Said parameters may comprised numerology and/or number of CP samples (e.g. 144 or 512), and/or associated subframe/slot parameters such as subframe/slot duration. Setting up such parameters may ensure that CP duration resulting from such parametrisation is large enough for the resulting effective channels for all users assigned to that sub-group for covering the time dispersion. This, in turn, will ensure a communication link (like an OFDM link) robust against delay dispersion while minimizing overall CP overhead (e.g., such that each user is served with minimum possible CP).

In one variant, the transmission parameters or OFDM modulation parameters per subgroup are set such that the resulting CP duration is larger than the maximum device DS within that subgroup. For example, in the case of subgrouping of devices according to the second variant and table 3's case, there are two subgroups. The largest DS associated with subgroup #1 is 40 ns, and with subgroup #2 is 25 ns. Then, the OFDM transmission parameters used to serve subgroup 1 should ensure that the CP duration is enough to deal with a DS of 40 ns. Similarly, OFDM transmission parameters used to serve subgroup 2, should ensure that the CP duration is larger than 25 ns. For example, the NW can find a OFDM parametrisation to serve subgroup 1, such that the associate CP duration is equal or larger than 40 ns.

In another variant (which may be alternative or additional to above variant), the MCS may be determined by considering the RSS/SINR/ . . . that is related to the allocated beams, not necessarily the preferred beams from the signal strength point of view.

The NW should then use the obtained beam/modulation configuration obtained from the procedure to serve the groups of devices: either in transmit mode and/or receive mode.

Figure 3:
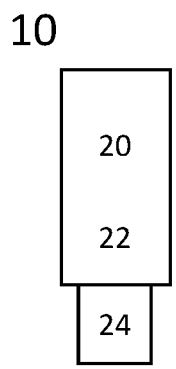
FIG. 3, showing an exemplary radio node.

FIG. 3 schematically shows a radio node, in particular a terminal 10 or a UE (User Equipment). Radio node 10 comprises processing circuitry (which may also be referred to as control circuitry) 20, which may comprise a controller connected to a memory. Any module of the radio node 10, e.g. a communicating module or determining module, may be implemented in and/or executable by, the processing circuitry 20, in particular as module in the controller. Radio node 10 also comprises radio circuitry 22 providing receiving and transmitting or transceiving functionality (e.g., one or more transmitters and/or receivers and/or transceivers), the radio circuitry 22 being connected or connectable to the processing circuitry. An antenna circuitry 24 of the radio node 10 is connected or connectable to the radio circuitry 22 to collect or send and/or amplify signals. Radio circuitry 22 and the processing circuitry 20 controlling it are configured for cellular communication with a network, e.g. a RAN as described herein, and/or for sidelink communication. Radio node 10 may generally be adapted to carry out any of the methods of operating a radio node like terminal or UE disclosed herein; in particular, it may comprise corresponding circuitry, e.g. processing circuitry, and/or modules, e.g. software modules. It may be considered that the radio node 10 comprises, and/or is connected or connectable to, to a power supply.

Figure 4:
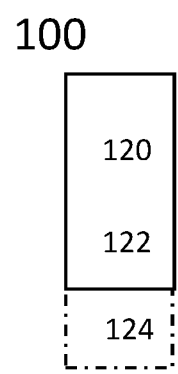
FIG. 4, showing another exemplary radio node.

FIG. 4 schematically show a radio node 100, which may in particular be implemented as a network node 100, for example an eNB or gNB or similar for NR. Radio node 100 comprises processing circuitry (which may also be referred to as control circuitry) 120, which may comprise a controller connected to a memory. Any module, e.g. transmitting module and/or receiving module and/or configuring module of the node 100 may be implemented in and/or executable by the processing circuitry 120. The processing circuitry 120 is connected to control radio circuitry 122 of the node 100, which provides receiver and transmitter and/or transceiver functionality (e.g., comprising one or more transmitters and/or receivers and/or transceivers). An antenna circuitry 124 may be connected or connectable to radio circuitry 122 for signal reception or transmittance and/or amplification. Node 100 may be adapted to carry out any of the methods for operating a radio node or network node disclosed herein; in particular, it may comprise corresponding circuitry, e.g. processing circuitry, and/or modules. The antenna circuitry 124 may be connected to and/or comprise an antenna array. The node 100, respectively its circuitry, may be adapted to perform any of the methods of operating a network node or a radio node as described herein; in particular, it may comprise corresponding circuitry, e.g. processing circuitry, and/or modules. The radio node 100 may generally comprise communication circuitry, e.g. for communication with another network node, like a radio node, and/or with a core network and/or an internet or local net, in particular with an information system, which may provide information and/or data to be transmitted to a user equipment.

In general, a UE or measuring radio node may be configured with a reference signaling configuration, for example via control signaling, e.g. higher layer signaling like RRC signaling and/or MAC signaling, and/or physical layer signaling, e.g. DCI signaling. A reference signaling configuration may generally indicate resources for reference signaling, and/or a sequence (e.g., of modulation symbols), which may be mapped to the reference signaling resources of the indicated resources, and/or a cover code and/or cyclic shift to be applied to the sequence and/or resources, and/or the timing (e.g., on a slot or symbol level) of the reference signaling, and/or timing of providing a measurement report pertaining to the reference signaling and/or may indicate and/or may pertain to one or more beams, which may be transmission and/or reception beams. The measurement report may be periodic and/or semi-static, or aperiodic and/or dynamic, e.g. triggered by and/or in response to physical layer signaling, e.g. a scheduling grant or scheduling assignment.

Resources for reference signaling may be represented by a set of resources, which may include resources, in particular resource elements, intended to carry and/or carrying reference signaling and/or associated symbols (e.g., modulation symbols). A measuring radio node may perform measurement on the reference signaling, based on which measurement information may be determined, e.g. in the form of a measurement report. A measurement report may be transmitted to the network, e.g. a network node, e.g. based on the reference signaling and/or a measurement configuration and/or a reference signaling configuration and/or control signaling like DCI or SCI triggering the measurement and/or measurement report. Reference signaling may be arranged in frequency space in a comb structure, wherein between two subcarriers or resource blocks carrying reference signaling and/or a modulation symbol thereof, there is at least one subcarrier or resource block not carrying reference signaling, e.g. empty or muted, or carrying other signaling, for example data signaling or control signaling.

In some variants, reference signaling may be and/or comprise CSI-RS, e.g. transmitted by the network node. In other variants, the reference signaling may be transmitted by a UE, e.g. to a network node or other UE, in which case it may comprise and/or be Sounding Reference Signaling. Other, e.g. new, forms of reference signaling may be considered and/or used. In general, a modulation symbol of reference signaling respectively a resource element carrying it may be associated to a cyclic prefix.

Measurement information may generally comprise information determined and/or derived based on measurement/s, e.g. by sampling and/or processing measured samples, for example combining and/or averaging and/or weighing and/or classifying (e.g., by comparing with a threshold) and/or adding and/or integrating and/or differentiating and/or performing one or more transformations and/or evaluations and/or estimations. A measurement report may comprise and/or represent and/or be based on measurement information. Measurement information may pertain to one or more beams, each of which may carry reference signaling, and/or may pertain to a beam at different times, e.g. when the beam is swept, and/or at different slots or transmission timing structures. The beams may be beams transmitted by a radio node, in particular a network node. Measurements may be performed based on one or more reception beams, or without. It may be considered that measurements are performed based on beam pairs, each beam pair comprising a transmission beam and a reception beam. A reception beam may be used by a measuring radio node for reception. A measurement report and/or measurement information may indicate a transmission beam and/or reception beam and/or beam pair used for measurement.

In some cases, a measuring radio node may be adapted to operate based on measurement information, in particular transmit and/or receive based on measurement information. For example, it may adapt its transmission timing and/or beamforming (e.g., reception beamforming and/or transmission beamforming) based on measurement information and/or which information or data to transmit (e.g., from a buffer and/or one or more logical channels and/or associated to different bearers), for example to compensate for measured delay.

In some cases, a radio node may be adapted to communicate with a measuring radio node based on a received measurement report. Communicating based on a measurement report and/or delay spread information may for example comprise scheduling transmission to and/or from a measuring radio node and/or for one or more channels based on the report or information, and/or performing beamforming (e.g., reception beamforming and/or transmission beamforming) for communication based on the report or information, and/or performing link adaptation (e.g., adapting a MCS) based on the report or information, and/or changing and/or adapting and/or configuring bandwidth and/or bandwidth part and/or numerology based on the report or information. The communication may be between the measuring radio node and the radio node.

Data signaling may be on a data channel, for example on a PDSCH or PSSCH, or on a dedicated data channel, e.g. for low latency and/or high reliability, e.g. a URLLC channel. Control signaling may be on a control channel, for example on a common control channel or a PDCCH or PSCCH, and/or comprise one or more DCI messages or SCI messages. Reference signaling may be associated to control signaling and/or data signaling, e.g. DM-RS and/or PT-RS.

Reference signaling, for example, may comprise DM-RS and/or pilot signaling and/or discovery signaling and/or synchronisation signaling and/or sounding signaling and/or phase tracking signaling and/or cell-specific reference signaling and/or user-specific signaling, in particular CSI-RS. Reference signaling in general may be signaling with one or more signaling characteristics, in particular transmission power and/or sequence of modulation symbols and/or resource distribution and/or phase distribution known to the receiver. Thus, the receiver can use the reference signaling as a reference and/or for training and/or for compensation. The receiver can be informed about the reference signaling by the transmitter, e.g. being configured and/or signaling with control signaling, in particular physical layer signaling and/or higher layer signaling (e.g., DCI and/or RRC signaling), and/or may determine the corresponding information itself, e.g. a network node configuring a UE to transmit reference signaling. Reference signaling may be signaling comprising one or more reference symbols and/or structures. Reference signaling may be adapted for gauging and/or estimating and/or representing transmission conditions, e.g. channel conditions and/or transmission path conditions and/or channel (or signal or transmission) quality. It may be considered that the transmission characteristics (e.g., signal strength and/or form and/or modulation and/or timing) of reference signaling are available for both transmitter and receiver of the signaling (e.g., due to being predefined and/or configured or configurable and/or being communicated).

Different types of reference signaling may be considered, e.g. pertaining to uplink, downlink or sidelink, cell-specific (in particular, cell-wide, e.g., CRS) or device or user specific (addressed to a specific target or user equipment, e.g., CSI-RS), demodulation-related (e.g., DMRS) and/or signal strength related, e.g. power-related or energy-related or amplitude-related (e.g., SRS or pilot signaling) and/or phase-related, etc.

References to specific resource structures like transmission timing structure and/or symbol and/or slot and/or mini-slot and/or subcarrier and/or carrier may pertain to a specific numerology, which may be predefined and/or configured or configurable. A transmission timing structure may represent a time interval, which may cover one or more symbols. Some examples of a transmission timing structure are transmission time interval (TTI), subframe, slot and mini-slot. A slot may comprise a predetermined, e.g. predefined and/or configured or configurable, number of symbols, e.g. 6 or 7, or 12 or 14. A mini-slot may comprise a number of symbols (which may in particular be configurable or configured) smaller than the number of symbols of a slot, in particular 1, 2, 3 or 4, or more symbols, e.g. less symbols than symbols in a slot. A transmission timing structure may cover a time interval of a specific length, which may be dependent on symbol time length and/or cyclic prefix used. A transmission timing structure may pertain to, and/or cover, a specific time interval in a time stream, e.g. synchronized for communication. Timing structures used and/or scheduled for transmission, e.g. slot and/or mini-slots, may be scheduled in relation to, and/or synchronized to, a timing structure provided and/or defined by other transmission timing structures. Such transmission timing structures may define a timing grid, e.g., with symbol time intervals within individual structures representing the smallest timing units. Such a timing grid may for example be defined by slots or subframes (wherein in some cases, subframes may be considered specific variants of slots). A transmission timing structure may have a duration (length in time) determined based on the durations of its symbols, possibly in addition to cyclic prefix/es used. The symbols of a transmission timing structure may have the same duration, or may in some variants have different duration. The number of symbols in a transmission timing structure may be predefined and/or configured or configurable, and/or be dependent on numerology. The timing of a mini-slot may generally be configured or configurable, in particular by the network and/or a network node. The timing may be configurable to start and/or end at any symbol of the transmission timing structure, in particular one or more slots.

There is generally considered a program product comprising instructions adapted for causing processing and/or control circuitry to carry out and/or control any method described herein, in particular when executed on the processing and/or control circuitry. Also, there is considered a carrier medium arrangement carrying and/or storing a program product as described herein.

A carrier medium arrangement may comprise one or more carrier media. Generally, a carrier medium may be accessible and/or readable and/or receivable by processing or control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

A system comprising one or more radio nodes as described herein, in particular a network node and a user equipment, is described. The system may be a wireless communication system, and/or provide and/or represent a radio access network.

Moreover, there may be generally considered a method of operating an information system, the method comprising providing information. Alternatively, or additionally, an information system adapted for providing information may be considered. Providing information may comprise providing information for, and/or to, a target system, which may comprise and/or be implemented as radio access network and/or a radio node, in particular a network node or user equipment or terminal. Providing information may comprise transferring and/or streaming and/or sending and/or passing on the information, and/or offering the information for such and/or for download, and/or triggering such providing, e.g. by triggering a different system or node to stream and/or transfer and/or send and/or pass on the information. The information system may comprise, and/or be connected or connectable to, a target, for example via one or more intermediate systems, e.g. a core network and/or internet and/or private or local network. Information may be provided utilising and/or via such intermediate system/s. Providing information may be for radio transmission and/or for transmission via an air interface and/or utilising a RAN or radio node as described herein. Connecting the information system to a target, and/or providing information, may be based on a target indication, and/or adaptive to a target indication. A target indication may indicate the target, and/or one or more parameters of transmission pertaining to the target and/or the paths or connections over which the information is provided to the target. Such parameter/s may in particular pertain to the air interface and/or radio access network and/or radio node and/or network node. Example parameters may indicate for example type and/or nature of the target, and/or transmission capacity (e.g., data rate) and/or latency and/or reliability and/or cost, respectively one or more estimates thereof. The target indication may be provided by the target, or determined by the information system, e.g. based on information received from the target and/or historical information, and/or be provided by a user, for example a user operating the target or a device in communication with the target, e.g. via the RAN and/or air interface. For example, a user may indicate on a user equipment communicating with the information system that information is to be provided via a RAN, e.g. by selecting from a selection provided by the information system, for example on a user application or user interface, which may be a web interface. An information system may comprise one or more information nodes. An information node may generally comprise processing circuitry and/or communication circuitry. In particular, an information system and/or an information node may be implemented as a computer and/or a computer arrangement, e.g. a host computer or host computer arrangement and/or server or server arrangement. In some variants, an interaction server (e.g., web server) of the information system may provide a user interface, and based on user input may trigger transmitting and/or streaming information provision to the user (and/or the target) from another server, which may be connected or connectable to the interaction server and/or be part of the information system or be connected or connectable thereto. The information may be any kind of data, in particular data intended for a user of for use at a terminal, e.g. video data and/or audio data and/or location data and/or interactive data and/or game-related data and/or environmental data and/or technical data and/or traffic data and/or vehicular data and/or circumstantial data and/or operational data. The information provided by the information system may be mapped to, and/or mappable to, and/or be intended for mapping to, communication or data signaling and/or one or more data channels as described herein (which may be signaling or channel/s of an air interface and/or used within a RAN and/or for radio transmission). It may be considered that the information is formatted based on the target indication and/or target, e.g. regarding data amount and/or data rate and/or data structure and/or timing, which in particular may be pertaining to a mapping to communication or data signaling and/or a data channel. Mapping information to data signaling and/or data channel/s may be considered to refer to using the signaling/channel/s to carry the data, e.g. on higher layers of communication, with the signaling/channel/s underlying the transmission. A target indication generally may comprise different components, which may have different sources, and/or which may indicate different characteristics of the target and/or communication path/s thereto. A format of information may be specifically selected, e.g. from a set of different formats, for information to be transmitted on an air interface and/or by a RAN as described herein. This may be particularly pertinent since an air interface may be limited in terms of capacity and/or of predictability, and/or potentially be cost sensitive. The format may be selected to be adapted to the transmission indication, which may in particular indicate that a RAN or radio node as described herein is in the path (which may be the indicated and/or planned and/or expected path) of information between the target and the information system. A (communication) path of information may represent the interface/s (e.g., air and/or cable interfaces) and/or the intermediate system/s (if any), between the information system and/or the node providing or transferring the information, and the target, over which the information is, or is to be, passed on. A path may be (at least partly) undetermined when a target indication is provided, and/or the information is provided/transferred by the information system, e.g. if an internet is involved, which may comprise multiple, dynamically chosen paths. Information and/or a format used for information may be packet-based, and/or be mapped, and/or be mappable and/or be intended for mapping, to packets. Alternatively, or additionally, there may be considered a method for operating a target device comprising providing a target indicating to an information system. More alternatively, or additionally, a target device may be considered, the target device being adapted for providing a target indication to an information system. In another approach, there may be considered a target indication tool adapted for, and/or comprising an indication module for, providing a target indication to an information system. The target device may generally be a target as described above. A target indication tool may comprise, and/or be implemented as, software and/or application or app, and/or web interface or user interface, and/or may comprise one or more modules for implementing actions performed and/or controlled by the tool. The tool and/or target device may be adapted for, and/or the method may comprise, receiving a user input, based on which a target indicating may be determined and/or provided. Alternatively, or additionally, the tool and/or target device may be adapted for, and/or the method may comprise, receiving information and/or communication signaling carrying information, and/or operating on, and/or presenting (e.g., on a screen and/or as audio or as other form of indication), information. The information may be based on received information and/or communication signaling carrying information. Presenting information may comprise processing received information, e.g. decoding and/or transforming, in particular between different formats, and/or for hardware used for presenting. Operating on information may be independent of or without presenting, and/or proceed or succeed presenting, and/or may be without user interaction or even user reception, for example for automatic processes, or target devices without (e.g., regular) user interaction like MTC devices, of for automotive or transport or industrial use. The information or communication signaling may be expected and/or received based on the target indication. Presenting and/or operating on information may generally comprise one or more processing steps, in particular decoding and/or executing and/or interpreting and/or transforming information. Operating on information may generally comprise relaying and/or transmitting the information, e.g. on an air interface, which may include mapping the information onto signaling (such mapping may generally pertain to one or more layers, e.g. one or more layers of an air interface, e.g. RLC (Radio Link Control) layer and/or MAC layer and/or physical layer/s). The information may be imprinted (or mapped) on communication signaling based on the target indication, which may make it particularly suitable for use in a RAN (e.g., for a target device like a network node or in particular a UE or terminal). The tool may generally be adapted for use on a target device, like a UE or terminal. Generally, the tool may provide multiple functionalities, e.g. for providing and/or selecting the target indication, and/or presenting, e.g. video and/or audio, and/or operating on and/or storing received information. Providing a target indication may comprise transmitting or transferring the indication as signaling, and/or carried on signaling, in a RAN, for example if the target device is a UE, or the tool for a UE. It should be noted that such provided information may be transferred to the information system via one or more additionally communication interfaces and/or paths and/or connections. The target indication may be a higher-layer indication and/or the information provided by the information system may be higher-layer information, e.g. application layer or user-layer, in particular above radio layers like transport layer and physical layer. The target indication may be mapped on physical layer radio signaling, e.g. related to or on the user-plane, and/or the information may be mapped on physical layer radio communication signaling, e.g. related to or on the user-plane (in particular, in reverse communication directions). The described approaches allow a target indication to be provided, facilitating information to be provided in a specific format particularly suitable and/or adapted to efficiently use an air interface. A user input may for example represent a selection from a plurality of possible transmission modes or formats, and/or paths, e.g. in terms of data rate and/or packaging and/or size of information to be provided by the information system.

In general, a numerology and/or subcarrier spacing may indicate the bandwidth (in frequency domain) of a subcarrier of a carrier, and/or the number of subcarriers in a carrier and/or the numbering of the subcarriers in a carrier, and/or the symbol time length. Different numerologies may in particular be different in the bandwidth of a subcarrier. In some variants, all the subcarriers in a carrier have the same bandwidth associated to them. The numerology and/or subcarrier spacing may be different between carriers in particular regarding the subcarrier bandwidth. A symbol time length, and/or a time length of a timing structure pertaining to a carrier may be dependent on the carrier frequency, and/or the subcarrier spacing and/or the numerology. In particular, different numerologies may have different symbol time lengths, even on the same carrier.

Signaling may generally comprise one or more (e.g., modulation) symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel.

An antenna arrangement may comprise one or more antenna elements (radiating elements), which may be combined in antenna arrays. An antenna array or subarray may comprise one antenna element, or a plurality of antenna elements, which may be arranged e.g. two dimensionally (for example, a panel) or three dimensionally. It may be considered that each antenna array or subarray or element is separately controllable, respectively that different antenna arrays are controllable separately from each other. A single antenna element/radiator may be considered the smallest example of a subarray. Examples of antenna arrays comprise one or more multi-antenna panels or one or more individually controllable antenna elements. An antenna arrangement may comprise a plurality of antenna arrays. It may be considered that an antenna arrangement is associated to a (specific and/or single) radio node, e.g. a configuring or informing or scheduling radio node, e.g. to be controlled or controllable by the radio node. An antenna arrangement associated to a UE or terminal may be smaller (e.g., in size and/or number of antenna elements or arrays) than the antenna arrangement associated to a network node. Antenna elements of an antenna arrangement may be configurable for different arrays, e.g. to change the beamforming characteristics. In particular, antenna arrays may be formed by combining one or more independently or separately controllable antenna elements or subarrays. The beams may be provided by analog beamforming, or in some variants by digital beamforming, or by hybrid beamforming combing analog and digital beamforming. The informing radio nodes may be configured with the manner of beam transmission, e.g. by transmitting a corresponding indicator or indication, for example as beam identify indication. However, there may be considered cases in which the informing radio node/s are not configured with such information, and/or operate transparently, not knowing the way of beamforming used. An antenna arrangement may be considered separately controllable in regard to the phase and/or amplitude/power and/or gain of a signal feed to it for transmission, and/or separately controllable antenna arrangements may comprise an independent or separate transmit and/or receive unit and/or ADC (Analog-Digital-Converter, alternatively an ADC chain) or DCA (Digital-to-Analog Converter, alternatively a DCA chain) to convert digital control information into an analog antenna feed for the whole antenna arrangement (the ADC/DCA may be considered part of, and/or connected or connectable to, antenna circuitry) or vice versa. A scenario in which an ADC or DCA is controlled directly for beamforming may be considered an analog beamforming scenario; such controlling may be performed after encoding/decoding and/or after modulation symbols have been mapped to resource elements. This may be on the level of antenna arrangements using the same ADC/DCA, e.g. one antenna element or a group of antenna elements associated to the same ADC/DCA. Digital beamforming may correspond to a scenario in which processing for beamforming is provided before feeding signaling to the ADC/DCA, e.g. by using one or more precoder/s and/or by precoding information, for example before and/or when mapping modulation symbols to resource elements. Such a precoder for beamforming may provide weights, e.g. for amplitude and/or phase, and/or may be based on a (precoder) codebook, e.g. selected from a codebook. A precoder may pertain to one beam or more beams, e.g. defining the beam or beams. The codebook may be configured or configurable, and/or be predefined. DFT beamforming may be considered a form of digital beamforming, wherein a DFT procedure is used to form one or more beams. Hybrid forms of beamforming may be considered.

A beam may be defined by a spatial and/or angular and/or spatial angular distribution of radiation and/or a spatial angle (also referred to as solid angle) or spatial (solid) angle distribution into which radiation is transmitted (for transmission beamforming) or from which it is received (for reception beamforming). Reception beamforming may comprise only accepting signals coming in from a reception beam (e.g., using analog beamforming to not receive outside reception beam/s), and/or sorting out signals that do not come in in a reception beam, e.g. in digital postprocessing, e.g. digital beamforming. A beam may have a solid angle equal to or smaller than 4*pi sr (4*pi correspond to a beam covering all directions), in particular smaller than 2*pi, or pi, or pi/2, or pi/4 or pi/8 or pi/16. In particular for high frequencies, smaller beams may be used. Different beams may have different directions and/or sizes (e.g., solid angle and/or reach). A beam may have a main direction, which may be defined by a main lobe (e.g., center of the main lobe, e.g. pertaining to signal strength and/or solid angle, which may be averaged and/or weighted to determine the direction), and may have one or more sidelobes. A lobe may generally be defined to have a continuous or contiguous distribution of energy and/or power transmitted and/or received, e.g. bounded by one or more contiguous or contiguous regions of zero energy (or practically zero energy). A main lobe may comprise the lobe with the largest signal strength and/or energy and/or power content. However, sidelobes usually appear due to limitations of beamforming, some of which may carry signals with significant strength, and may cause multi-path effects. A sidelobe may generally have a different direction than a main lobe and/or other side lobes, however, due to reflections a sidelobe still may contribute to transmitted and/or received energy or power. A beam may be swept and/or switched over time, e.g., such that its (main) direction is changed, but its shape (angular/solid angle distribution) around the main direction is not changed, e.g. from the transmitters views for a transmission beam, or the receivers view for a reception beam, respectively. Sweeping may correspond to continuous or near continuous change of main direction (e.g., such that after each change, the main lobe from before the change covers at least partly the main lobe after the change, e.g. at least to 50 or 75 or 90 percent). Switching may correspond to switching direction non-continuously, e.g. such that after each change, the main lobe from before the change does not cover the main lobe after the change, e.g. at most to 50 or 25 or 10 percent.

Signal strength may be a representation of signal power and/or signal energy, e.g. as seen from a transmitting node or a receiving node. A beam with larger strength at transmission (e.g., according to the beamforming used) than another beam does may not necessarily have larger strength at the receiver, and vice versa, for example due to interference and/or obstruction and/or dispersion and/or absorption and/or reflection and/or attrition or other effects influencing a beam or the signaling it carries. Signal quality may in general be a representation of how well a signal may be received over noise and/or interference. A beam with better signal quality than another beam does not necessarily have a larger beam strength than the other beam. Signal quality may be represented for example by SIR, SNR, SINR, BER, BLER, Energy per resource element over noise/interference or another corresponding quality measure. Signal quality and/or signal strength may pertain to, and/or may be measured with respect to, a beam, and/or specific signaling carried by the beam, e.g. reference signaling and/or a specific channel, e.g. a data channel or control channel. Signal strength may be represented by received signal strength, and/or relative signal strength, e.g. in comparison to a reference signal (strength).

Uplink or sidelink signaling may be OFDMA (Orthogonal Frequency Division Multiple Access) or SC-FDMA (Single Carrier Frequency Division Multiple Access) signaling. Downlink signaling may in particular be OFDMA signaling. However, signaling is not limited thereto (Filter-Bank based signaling and/or Single-Carrier based signaling, e.g. SC-FDE signaling, may be considered alternatives).

A radio node may generally be considered a device or node adapted for wireless and/or radio (and/or millimeter wave) frequency communication, and/or for communication utilising an air interface, e.g. according to a communication standard.

A radio node may be a network node, or a user equipment or terminal. A network node may be any radio node of a wireless communication network, e.g. a base station and/or gNodeB (gNB) and/or eNodeB (eNB) and/or relay node and/or micro/nano/pico/femto node and/or transmission point (TP) and/or access point (AP) and/or other node, in particular for a RAN or other wireless communication network as described herein.

The terms user equipment (UE) and terminal may be considered to be interchangeable in the context of this disclosure. A wireless device, user equipment or terminal may represent an end device for communication utilising the wireless communication network, and/or be implemented as a user equipment according to a standard. Examples of user equipments may comprise a phone like a smartphone, a personal communication device, a mobile phone or terminal, a computer, in particular laptop, a sensor or machine with radio capability (and/or adapted for the air interface), in particular for MTC (Machine-Type-Communication, sometimes also referred to M2M, Machine-To-Machine), or a vehicle adapted for wireless communication. A user equipment or terminal may be mobile or stationary. A wireless device generally may comprise, and/or be implemented as, processing circuitry and/or radio circuitry, which may comprise one or more chips or sets of chips. The circuitry and/or circuitries may be packaged, e.g. in a chip housing, and/or may have one or more physical interfaces to interact with other circuitry and/or for power supply. Such a wireless device may be intended for use in a user equipment or terminal.

A radio node may generally comprise processing circuitry and/or radio circuitry. A radio node, in particular a network node, may in some cases comprise cable circuitry and/or communication circuitry, with which it may be connected or connectable to another radio node and/or a core network.

Circuitry may comprise integrated circuitry. Processing circuitry may comprise one or more processors and/or controllers (e.g., microcontrollers), and/or ASICs (Application Specific Integrated Circuitry) and/or FPGAs (Field Programmable Gate Array), or similar. It may be considered that processing circuitry comprises, and/or is (operatively) connected or connectable to one or more memories or memory arrangements. A memory arrangement may comprise one or more memories. A memory may be adapted to store digital information. Examples for memories comprise volatile and non-volatile memory, and/or Random Access Memory (RAM), and/or Read-Only-Memory (ROM), and/or magnetic and/or optical memory, and/or flash memory, and/or hard disk memory, and/or EPROM or EEPROM (Erasable Programmable ROM or Electrically Erasable Programmable ROM).

Radio circuitry may comprise one or more transmitters and/or receivers and/or transceivers (a transceiver may operate or be operable as transmitter and receiver, and/or may comprise joint or separated circuitry for receiving and transmitting, e.g. in one package or housing), and/or may comprise one or more amplifiers and/or oscillators and/or filters, and/or may comprise, and/or be connected or connectable to antenna circuitry and/or one or more antennas and/or antenna arrays. An antenna array may comprise one or more antennas, which may be arranged in a dimensional array, e.g. 2D or 3D array, and/or antenna panels. A remote radio head (RRH) may be considered as an example of an antenna array. However, in some variants, an RRH may be also be implemented as a network node, depending on the kind of circuitry and/or functionality implemented therein.

Communication circuitry may comprise radio circuitry and/or cable circuitry. Communication circuitry generally may comprise one or more interfaces, which may be air interface/s and/or cable interface/s and/or optical interface/s, e.g. laser-based. Interface/s may be in particular packet-based. Cable circuitry and/or a cable interfaces may comprise, and/or be connected or connectable to, one or more cables (e.g., optical fiber-based and/or wire-based), which may be directly or indirectly (e.g., via one or more intermediate systems and/or interfaces) be connected or connectable to a target, e.g. controlled by communication circuitry and/or processing circuitry.

Any one or all of the modules disclosed herein may be implemented in software and/or firmware and/or hardware. Different modules may be associated to different components of a radio node, e.g. different circuitries or different parts of a circuitry. It may be considered that a module is distributed over different components and/or circuitries. A program product as described herein may comprise the modules related to a device on which the program product is intended (e.g., a user equipment or network node) to be executed (the execution may be performed on, and/or controlled by the associated circuitry).

A wireless communication network may be or comprise a radio access network and/or a backhaul network (e.g. a relay or backhaul network or an IAB network), and/or a Radio Access Network (RAN) in particular according to a communication standard. A communication standard may in particular a standard according to 3GPP and/or 5G, e.g. according to NR or LTE, in particular LTE Evolution.

A wireless communication network may be and/or comprise a Radio Access Network (RAN), which may be and/or comprise any kind of cellular and/or wireless radio network, which may be connected or connectable to a core network. The approaches described herein are particularly suitable for a 5G network, e.g. LTE Evolution and/or NR (New Radio), respectively successors thereof. A RAN may comprise one or more network nodes, and/or one or more terminals, and/or one or more radio nodes. A network node may in particular be a radio node adapted for radio and/or wireless and/or cellular communication with one or more terminals. A terminal may be any device adapted for radio and/or wireless and/or cellular communication with or within a RAN, e.g. a user equipment (UE) or mobile phone or smartphone or computing device or vehicular communication device or device for machine-type-communication (MTC), etc. A terminal may be mobile, or in some cases stationary. A RAN or a wireless communication network may comprise at least one network node and a UE, or at least two radio nodes. There may be generally considered a wireless communication network or system, e.g. a RAN or RAN system, comprising at least one radio node, and/or at least one network node and at least one terminal.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Control information or a control information message or corresponding signaling (control signaling) may be transmitted on a control channel, e.g. a physical control channel, which may be a downlink channel or (or a sidelink channel in some cases, e.g. one UE scheduling another UE). For example, control information/allocation information may be signaled by a network node on PDCCH (Physical Downlink Control Channel) and/or a PDSCH (Physical Downlink Shared Channel) and/or a HARQ-specific channel. Acknowledgement signaling, e.g. as a form of control information or signaling like uplink control information/signaling, may be transmitted by a terminal on a PUCCH (Physical Uplink Control Channel) and/or PUSCH (Physical Uplink Shared Channel) and/or a HARQ-specific channel. Multiple channels may apply for multi-component/multi-carrier indication or signaling.

Signaling may generally be considered to represent an electromagnetic wave structure (e.g., over a time interval and frequency interval), which is intended to convey information to at least one specific or generic (e.g., anyone who might pick up the signaling) target. A process of signaling may comprise transmitting the signaling. Transmitting signaling, in particular control signaling or communication signaling, e.g. comprising or representing acknowledgement signaling and/or resource requesting information, may comprise encoding and/or modulating. Encoding and/or modulating may comprise error detection coding and/or forward error correction encoding and/or scrambling. Receiving control signaling may comprise corresponding decoding and/or demodulation. Error detection coding may comprise, and/or be based on, parity or checksum approaches, e.g. CRC (Cyclic Redundancy Check). Forward error correction coding may comprise and/or be based on for example turbo coding and/or Reed-Muller coding, and/or polar coding and/or LDPC coding (Low Density Parity Check). The type of coding used may be based on the channel (e.g., physical channel) the coded signal is associated to. A code rate may represent the ratio of the number of information bits before encoding to the number of encoded bits after encoding, considering that encoding adds coding bits for error detection coding and forward error correction. Coded bits may refer to information bits (also called systematic bits) plus coding bits.

Communication signaling may comprise, and/or represent, and/or be implemented as, data signaling, and/or user plane signaling. Communication signaling may be associated to a data channel, e.g. a physical downlink channel or physical uplink channel or physical sidelink channel, in particular a PDSCH (Physical Downlink Shared Channel) or PSSCH (Physical Sidelink Shared Channel). Generally, a data channel may be a shared channel or a dedicated channel. Data signaling may be signaling associated to and/or on a data channel.

An indication generally may explicitly and/or implicitly indicate the information it represents and/or indicates. Implicit indication may for example be based on position and/or resource used for transmission. Explicit indication may for example be based on a parametrisation with one or more parameters, and/or one or more index or indices, and/or one or more bit patterns representing the information. It may in particular be considered that control signaling as described herein, based on the utilised resource sequence, implicitly indicates the control signaling type.

A resource element may generally describe the smallest individually usable and/or encodable and/or decodable and/or modulatable and/or demodulatable time-frequency resource, and/or may describe a time-frequency resource covering a symbol time length in time and a subcarrier in frequency. A signal may be allocatable and/or allocated to a resource element. A subcarrier may be a subband of a carrier, e.g. as defined by a standard. A carrier may define a frequency and/or frequency band for transmission and/or reception. In some variants, a signal (jointly encoded/modulated) may cover more than one resource elements. A resource element may generally be as defined by a corresponding standard, e.g. NR or LTE. As symbol time length and/or subcarrier spacing (and/or numerology) may be different between different symbols and/or subcarriers, different resource elements may have different extension (length/ width) in time and/or frequency domain, in particular resource elements pertaining to different carriers.

A resource generally may represent a time-frequency and/or code resource, on which signaling, e.g. according to a specific format, may be communicated, for example transmitted and/or received, and/or be intended for transmission and/or reception.

A border symbol may generally represent a starting symbol or an ending symbol for transmitting and/or receiving. A starting symbol may in particular be a starting symbol of uplink or sidelink signaling, for example control signaling or data signaling. Such signaling may be on a data channel or control channel, e.g. a physical channel, in particular a physical uplink shared channel (like PUSCH) or a sidelink data or shared channel, or a physical uplink control channel (like PUCCH) or a sidelink control channel. If the starting symbol is associated to control signaling (e.g., on a control channel), the control signaling may be in response to received signaling (in sidelink or downlink), e.g. representing acknowledgement signaling associated thereto, which may be HARQ or ARQ signaling. An ending symbol may represent an ending symbol (in time) of downlink or sidelink transmission or signaling, which may be intended or scheduled for the radio node or user equipment. Such downlink signaling may in particular be data signaling, e.g. on a physical downlink channel like a shared channel, e.g. a PDSCH (Physical Downlink Shared Channel). A starting symbol may be determined based on, and/or in relation to, such an ending symbol.

Configuring a radio node, in particular a terminal or user equipment, may refer to the radio node being adapted or caused or set and/or instructed to operate according to the configuration. Configuring may be done by another device, e.g., a network node (for example, a radio node of the network like a base station or eNodeB) or network, in which case it may comprise transmitting configuration data to the radio node to be configured. Such configuration data may represent the configuration to be configured and/or comprise one or more instruction pertaining to a configuration, e.g. a configuration for transmitting and/or receiving on allocated resources, in particular frequency resources. A radio node may configure itself, e.g., based on configuration data received from a network or network node. A network node may utilise, and/or be adapted to utilise, its circuitry/ies for configuring. Allocation information may be considered a form of configuration data. Configuration data may comprise and/or be represented by configuration information, and/or one or more corresponding indications and/or message/s Generally, configuring may include determining configuration data representing the configuration and providing, e.g. transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor.

A resource structure may be considered to be neighbored in frequency domain by another resource structure, if they share a common border frequency, e.g. one as an upper frequency border and the other as a lower frequency border. Such a border may for example be represented by the upper end of a bandwidth assigned to a subcarrier n, which also represents the lower end of a bandwidth assigned to a subcarrier n+1. A resource structure may be considered to be neighbored in time domain by another resource structure, if they share a common border time, e.g. one as an upper (or right in the figures) border and the other as a lower (or left in the figures) border. Such a border may for example be represented by the end of the symbol time interval assigned to a symbol n, which also represents the beginning of a symbol time interval assigned to a symbol n+1.

Generally, a resource structure being neighbored by another resource structure in a domain may also be referred to as abutting and/or bordering the other resource structure in the domain.

A resource structure may general represent a structure in time and/or frequency domain, in particular representing a time interval and a frequency interval. A resource structure may comprise and/or be comprised of resource elements, and/or the time interval of a resource structure may comprise and/or be comprised of symbol time interval/s, and/or the frequency interval of a resource structure may comprise and/or be comprised of subcarrier/s. A resource element may be considered an example for a resource structure, a slot or mini-slot or a Physical Resource Block (PRB) or parts thereof may be considered others. A resource structure may be associated to a specific channel, e.g. a PUSCH or PUCCH, in particular resource structure smaller than a slot or PRB.

Examples of a resource structure in frequency domain comprise a bandwidth or band, or a bandwidth part. A bandwidth part may be a part of a bandwidth available for a radio node for communicating, e.g. due to circuitry and/or configuration and/or regulations and/or a standard. A bandwidth part may be configured or configurable to a radio node. In some variants, a bandwidth part may be the part of a bandwidth used for communicating, e.g. transmitting and/or receiving, by a radio node. The bandwidth part may be smaller than the bandwidth (which may be a device bandwidth defined by the circuitry/configuration of a device, and/or a system bandwidth, e.g. available for a RAN). It may be considered that a bandwidth part comprises one or more resource blocks or resource block groups, in particular one or more PRBs or PRB groups. A bandwidth part may pertain to, and/or comprise, one or more carriers.

A carrier may generally represent a frequency range or band and/or pertain to a central frequency and an associated frequency interval. It may be considered that a carrier comprises a plurality of subcarriers. A carrier may have assigned to it a central frequency or center frequency interval, e.g. represented by one or more subcarriers (to each subcarrier there may be generally assigned a frequency bandwidth or interval). Different carriers may be non-overlapping, and/or may be neighboring in frequency domain.

It should be noted that the term "radio" in this disclosure may be considered to pertain to wireless communication in general, and may also include wireless communication utilising millimeter waves, in particular above one of the thresholds GHz or 20 GHz or 50 GHz or 52 GHz or 52.6

GHz or 60 GHz or 72 GHz or 100 GHz or 114 GHz. Such communication may utilise one or more carriers, e.g. in FDD and/or carrier aggregation. Upper frequency boundaries may correspond to 300 GHz or 200 GHz or 120 GHz or any of the thresholds larger than the one representing the lower frequency boundary.

A radio node, in particular a network node or a terminal, may generally be any device adapted for transmitting and/or receiving radio and/or wireless signals and/or data, in particular communication data, in particular on at least one carrier. The at least one carrier may comprise a carrier accessed based on an LBT procedure (which may be called LBT carrier), e.g., an unlicensed carrier. It may be considered that the carrier is part of a carrier aggregate.

Receiving or transmitting on a cell or carrier may refer to receiving or transmitting utilizing a frequency (band) or spectrum associated to the cell or carrier. A cell may generally comprise and/or be defined by or for one or more carriers, in particular at least one carrier for UL communication/transmission (called UL carrier) and at least one carrier for DL communication/transmission (called DL carrier). It may be considered that a cell comprises different numbers of UL carriers and DL carriers. Alternatively, or additionally, a cell may comprise at least one carrier for UL communication/transmission and DL communication/transmission, e.g., in TDD-based approaches.

A channel may generally be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel and/or if it carries control plane information. Analogously, a channel carrying and/or for carrying data signaling/user information may be considered a data channel, in particular if it is a physical layer channel and/or if it carries user plane information. A channel may be defined for a specific communication direction, or for two complementary communication directions (e.g., UL and DL, or sidelink in two directions), in which case it may be considered to have two component channels, one for each direction. Examples of channels comprise a channel for low latency and/or high reliability transmission, in particular a channel for Ultra-Reliable Low Latency Communication (URLLC), which may be for control and/or data.

In general, a symbol may represent and/or be associated to a symbol time length, which may be dependent on the carrier and/or subcarrier spacing and/or numerology of the associated carrier. Accordingly, a symbol may be considered to indicate a time interval having a symbol time length in relation to frequency domain. A symbol time length may be dependent on a carrier frequency and/or bandwidth and/or numerology and/or subcarrier spacing of, or associated to, a symbol. Accordingly, different symbols may have different symbol time lengths. In particular, numerologies with different subcarrier spacings may have different symbol time length. Generally, a symbol time length may be based on, and/or include, a guard time interval or cyclic extension, e.g. prefix or postfix.

A sidelink may generally represent a communication channel (or channel structure) between two UEs and/or terminals, in which data is transmitted between the participants (UEs and/or terminals) via the communication channel, e.g. directly and/or without being relayed via a network node. A sidelink may be established only and/or directly via air interface/s of the participant, which may be directly linked via the sidelink communication channel. In some variants, sidelink communication may be performed without interaction by a network node, e.g. on fixedly defined resources and/or on resources negotiated between the participants. Alternatively, or additionally, it may be considered that a network node provides some control functionality, e.g. by configuring resources, in particular one or more resource pool/s, for sidelink communication, and/or monitoring a sidelink, e.g. for charging purposes.

Sidelink communication may also be referred to as device-to-device (D2D) communication, and/or in some cases as ProSe (Proximity Services) communication, e.g. in the context of LTE. A sidelink may be implemented in the context of V2x communication (Vehicular communication), e.g. V2V (Vehicle-to-Vehicle), V2I (Vehicle-to-Infrastructure) and/or V2P (Vehicle-to-Person). Any device adapted for sidelink communication may be considered a user equipment or terminal.

A sidelink communication channel (or structure) may comprise one or more (e.g., physical or logical) channels, e.g. a PSCCH (Physical Sidelink Control CHannel, which may for example carry control information like an acknowledgement position indication, and/or a PSSCH (Physical Sidelink Shared CHannel, which for example may carry data and/or acknowledgement signaling). It may be considered that a sidelink communication channel (or structure) pertains to and/or used one or more carrier/s and/or frequency range/s associated to, and/or being used by, cellular communication, e.g. according to a specific license and/or standard. Participants may share a (physical) channel and/or resources, in particular in frequency domain and/or related to a frequency resource like a carrier) of a sidelink, such that two or more participants transmit thereon, e.g. simultaneously, and/or time-shifted, and/or there may be associated specific channels and/or resources to specific participants, so that for example only one participant transmits on a specific channel or on a specific resource or specific resources, e.g., in frequency domain and/or related to one or more carriers or subcarriers.

A sidelink may comply with, and/or be implemented according to, a specific standard, e.g. an LTE-based standard and/or NR. A sidelink may utilise TDD (Time Division Duplex) and/or FDD (Frequency Division Duplex) technology, e.g. as configured by a network node, and/or preconfigured and/or negotiated between the participants. A user equipment may be considered to be adapted for sidelink communication if it, and/or its radio circuitry and/or processing circuitry, is adapted for utilising a sidelink, e.g. on one or more frequency ranges and/or carriers and/or in one or more formats, in particular according to a specific standard. It may be generally considered that a Radio Access Network is defined by two participants of a sidelink communication. Alternatively, or additionally, a Radio Access Network may be represented, and/or defined with, and/or be related to a network node and/or communication with such a node.

Communication or communicating may generally comprise transmitting and/or receiving signaling. Communication on a sidelink (or sidelink signaling) may comprise utilising the sidelink for communication (respectively, for signaling). Sidelink transmission and/or transmitting on a sidelink may be considered to comprise transmission utilising the sidelink, e.g. associated resources and/or transmission formats and/or circuitry and/or the air interface. Sidelink reception and/or receiving on a sidelink may be considered to comprise reception utilising the sidelink, e.g. associated resources and/or transmission formats and/or circuitry and/or the air interface. Sidelink control information (e.g., SCI) may generally be considered to comprise control information transmitted utilising a sidelink.

Generally, carrier aggregation (CA) may refer to the concept of a radio connection and/or communication link between a wireless and/or cellular communication network and/or network node and a terminal or on a sidelink comprising a plurality of carriers for at least one direction of transmission (e.g. DL and/or UL), as well as to the aggregate of carriers. A corresponding communication link may be referred to as carrier aggregated communication link or CA communication link; carriers in a carrier aggregate may be referred to as component carriers (CC). In such a link, data may be transmitted over more than one of the carriers and/or all the carriers of the carrier aggregation (the aggregate of carriers). A carrier aggregation may comprise one (or more) dedicated control carriers and/or primary carriers (which may e.g. be referred to as primary component carrier or PCC), over which control information may be transmitted, wherein the control information may refer to the primary carrier and other carriers, which may be referred to as secondary carriers (or secondary component carrier, SCC). However, in some approaches, control information may be sent over more than one carrier of an aggregate, e.g. one or more PCCs and one PCC and one or more SCCs.

A transmission may generally pertain to a specific channel and/or specific resources, in particular with a starting symbol and ending symbol in time, covering the interval therebetween. A scheduled transmission may be a transmission scheduled and/or expected and/or for which resources are scheduled or provided or reserved. However, not every scheduled transmission has to be realized. For example, a scheduled downlink transmission may not be received, or a scheduled uplink transmission may not be transmitted due to power limitations, or other influences (e.g., a channel on an unlicensed carrier being occupied). A transmission may be scheduled for a transmission timing substructure (e.g., a mini-slot, and/or covering only a part of a transmission timing structure) within a transmission timing structure like a slot. A border symbol may be indicative of a symbol in the transmission timing structure at which the transmission starts or ends.

Predefined in the context of this disclosure may refer to the related information being defined for example in a standard, and/or being available without specific configuration from a network or network node, e.g. stored in memory, for example independent of being configured. Configured or configurable may be considered to pertain to the corresponding information being set/configured, e.g. by the network or a network node.

A configuration or schedule, like a mini-slot configuration and/or structure configuration, may schedule transmissions, e.g. for the time/transmissions it is valid, and/or transmissions may be scheduled by separate signaling or separate configuration, e.g. separate RRC signaling and/or downlink control information signaling. The transmission/s scheduled may represent signaling to be transmitted by the device for which it is scheduled, or signaling to be received by the device for which it is scheduled, depending on which side of a communication the device is. It should be noted that downlink control information or specifically DCI signaling may be considered physical layer signaling, in contrast to higher layer signaling like MAC (Medium Access Control) signaling or RRC layer signaling. The higher the layer of signaling is, the less frequent/the more time/resource consuming it may be considered, at least partially due to the information contained in such signaling having to be passed on through several layers, each layer requiring processing and handling.

A scheduled transmission, and/or transmission timing structure like a mini-slot or slot, may pertain to a specific channel, in particular a physical uplink shared channel, a physical uplink control channel, or a physical downlink shared channel, e.g. PUSCH, PUCCH or PDSCH, and/or may pertain to a specific cell and/or carrier aggregation. A corresponding configuration, e.g. scheduling configuration or symbol configuration may pertain to such channel, cell and/or carrier aggregation. It may be considered that the scheduled transmission represents transmission on a physical channel, in particular a shared physical channel, for example a physical uplink shared channel or physical downlink shared channel. For such channels, semi-persistent configuring may be particularly suitable.

Generally, a configuration may be a configuration indicating timing, and/or be represented or configured with corresponding configuration data. A configuration may be embedded in, and/or comprised in, a message or configuration or corresponding data, which may indicate and/or schedule resources, in particular semi-persistently and/or semi-statically.

A control region of a transmission timing structure may be an interval in time and/or frequency domain for intended or scheduled or reserved for control signaling, in particular downlink control signaling, and/or for a specific control channel, e.g. a physical downlink control channel like PDCCH. The interval may comprise, and/or consist of, a number of symbols in time, which may be configured or configurable, e.g. by (UE-specific) dedicated signaling (which may be single-cast, for example addressed to or intended for a specific UE), e.g. on a PDCCH, or RRC signaling, or on a multicast or broadcast channel. In general, the transmission timing structure may comprise a control region covering a configurable number of symbols. It may be considered that in general the border symbol is configured to be after the control region in time. A control region may be associated, e.g. via configuration and/or determination, to one or more specific UEs and/or formats of PDCCH and/or DCI and/or identifiers, e.g. UE identifiers and/or RNTIs or carrier/cell identifiers, and/or be represented and/or associated to a CORESET and/or a search space.

The duration of a symbol (symbol time length or interval) of the transmission timing structure may generally be dependent on a numerology and/or carrier, wherein the numerology and/or carrier may be configurable. The numerology may be the numerology to be used for the scheduled transmission.

A transmission timing structure may comprise a plurality of symbols, and/or define an interval comprising several symbols (respectively their associated time intervals). In the context of this disclosure, it should be noted that a reference to a symbol for ease of reference may be interpreted to refer to the time domain projection or time interval or time component or duration or length in time of the symbol, unless it is clear from the context that the frequency domain component also has to be considered. Examples of transmission timing structures include slot, subframe, mini-slot (which also may be considered a substructure of a slot), slot aggregation (which may comprise a plurality of slots and may be considered a superstructure of a slot), respectively their time domain component. A transmission timing structure may generally comprise a plurality of symbols defining the time domain extension (e.g., interval or length or duration) of the transmission timing structure, and arranged neighboring to each other in a numbered sequence. A timing structure (which may also be considered or implemented as synchronisation structure) may be defined by a succession of such transmission timing structures, which may for example define a timing grid with symbols representing the smallest grid structures. A transmission timing structure, and/or a border symbol or a scheduled transmission may be determined or scheduled in relation to such a timing grid. A transmission timing structure of reception may be the transmission timing structure in which the scheduling control signaling is received, e.g. in relation to the timing grid. A transmission timing structure may in particular be a slot or subframe or in some cases, a mini-slot.

Feedback signaling may be considered a form or control signaling, e.g. uplink or sidelink control signaling, like UCI (Uplink Control Information) signaling or SCI (Sidelink Control Information) signaling. Feedback signaling may in particular comprise and/or represent acknowledgement signaling and/or acknowledgement information and/or measurement reporting.

Signaling utilising, and/or on and/or associated to, resources or a resource structure may be signaling covering the resources or structure, signaling on the associated frequency/ies and/or in the associated time interval/s. It may be considered that a signaling resource structure comprises and/or encompasses one or more substructures, which may be associated to one or more different channels and/or types of signaling and/or comprise one or more holes (resource element/s not scheduled for transmissions or reception of transmissions). A resource substructure, e.g. a feedback resource structure, may generally be continuous in time and/or frequency, within the associated intervals. It may be considered that a substructure, in particular a feedback resource structure, represents a rectangle filled with one or more resource elements in time/frequency space. However, in some cases, a resource structure or substructure, in particular a frequency resource range, may represent a non-continuous pattern of resources in one or more domains, e.g. time and/or frequency. The resource elements of a substructure may be scheduled for associated signaling.

Example types of signaling comprise signaling of a specific communication direction, in particular, uplink signaling, downlink signaling, sidelink signaling, as well as reference signaling (e.g., SRS or CRS or CSI-RS), communication signaling, control signaling, and/or signaling associated to a specific channel like PUSCH, PDSCH, PUCCH, PDCCH, PSCCH, PSSCH, etc.).

In the context of this disclosure, there may be distinguished between dynamically scheduled or aperiodic transmission and/or configuration, and semi-static or semi-persistent or periodic transmission and/or configuration. The term "dynamic" or similar terms may generally pertain to configuration/transmission valid and/or scheduled and/or configured for (relatively) short timescales and/or a (e.g., predefined and/or configured and/or limited and/or definite) number of occurrences and/or transmission timing structures, e.g. one or more transmission timing structures like slots or slot aggregations, and/or for one or more (e.g., specific number) of transmission/occurrences. Dynamic configuration may be based on low-level signaling, e.g. control signaling on the physical layer and/or MAC layer, in particular in the form of DCI or SCI. Periodic/semi-static may pertain to longer timescales, e.g. several slots and/or more than one frame, and/or a non-defined number of occurrences, e.g., until a dynamic configuration contradicts, or until a new periodic configuration arrives. A periodic or semi-static configuration may be based on, and/or be configured with, higher-layer signaling, in particular RCL layer signaling and/or RRC signaling and/or MAC signaling.

In this disclosure, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other variants and variants that depart from these specific details.

For example, the concepts and variants are partially described in the context of Long Term Evolution (LTE) or LTE-Advanced (LTE-A) or New Radio mobile or wireless communications technologies; however, this does not rule out the use of the present concepts and aspects in connection with additional or alternative mobile communication technologies such as the Global System for Mobile Communications (GSM) or IEEE standards as IEEE 802.11ad or IEEE 802.11 ay. While described variants may pertain to certain Technical Specifications (TSs) of the Third Generation Partnership Project (3GPP), it will be appreciated that the present approaches, concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the variants described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. The aspects presented herein can be varied in many ways.

Some useful abbreviations comprise

Abbreviation Explanation

ACK/NACK Acknowledgment/Negative Acknowledgement
ARQ Automatic Repeat reQuest
BER Bit Error Rate
BLER Block Error Rate
CAZAC Constant Amplitude Zero Cross Correlation
CB Code Block
CBG Code Block Group
CDM Code Division Multiplex
CM Cubic Metric
CORESET Control Resource Set
CQI Channel Quality Information
CRC Cyclic Redundancy Check
CRS Common reference signal
CSI Channel State Information
CSI-RS Channel state information reference signal DAI Downlink Assignment Indicator
DCI Downlink Control Information
DFT Discrete Fourier Transform
DM(-)RS Demodulation reference signal(ing)
eMBB enhanced Mobile BroadBand
FDD Frequency Division Duplex
FDM Frequency Division Multiplex
HARQ Hybrid Automatic Repeat Request
IAB Integrated Access and Backhaul
IFFT Inverse Fast Fourier Transform
MBB Mobile Broadband
MCS Modulation and Coding Scheme
MIMO Multiple-input-multiple-output
MRC Maximum-ratio combining
MRT Maximum-ratio transmission
MU-MIMO Multiuser multiple-input-multiple-output
OFDM/A Orthogonal Frequency Division Multiplex/Multiple Access
PAPR Peak to Average Power Ratio
PDCCH Physical Downlink Control Channel
PDSCH Physical Downlink Shared Channel
PRACH Physical Random Access CHannel
PRB Physical Resource Block
PUCCH Physical Uplink Control Channel
PUSCH Physical Uplink Shared Channel
(P)SCCH (Physical) Sidelink Control Channel
(P)SSCH (Physical) Sidelink Shared Channel
RAN Radio Access Network
RAT Radio Access Technology
RB Resource Block
RNTI Radio Network Temporary Identifier
RRC Radio Resource Control
RX Receiver, Reception, Reception-related/side
S A Scheduling Assignment
SC-FDE Single Carrier Frequency Domain Equalization
SC-FDM/A Single Carrier Frequency Division Multiplex/Multiple Access
SCI Sidelink Control Information
SINR Signal-to-interference-plus-noise ratio
SIR Signal-to-interference ratio
SNR Signal-to-noise-ratio
SR Scheduling Request
SRS Sounding Reference Signal(ing)
SVD Singular-value decomposition
T B Transport Block
TDD Time Division Duplex
TDM Time Division Multiplex
TX Transmitter, Transmission, Transmission-related/side
UCI Uplink Control Information
UE User Equipment
URLLC Ultra Low Latency High Reliability Communication
VL-MIMO Very-large multiple-input-multiple-output
ZF Zero Forcing
ZP Zero-Power, e.g. muted CSI-RS symbol Abbreviations may be considered to follow 3GPP usage if applicable.

The invention claimed is:

1. A method of operating a radio node in a wireless communication network, the method comprising:
obtaining delay characteristic information for a set of wireless devices, the delay characteristic information for each of the set of wireless devices pertaining to one or more signaling beams of a set of signaling beams;
assigning each wireless device of the set of wireless devices to at least one of a plurality of subgroups; and
communicating with the plurality of subgroups of wireless devices of the set of wireless devices using signaling beams selected from the set of signaling beams based on the delay characteristic information, for each subgroup, a different selected signaling beam being used for communicating.

2. The method according to claim 1, wherein the selected signaling beams are selected based on a beam signaling characteristic that at least one of represents and indicates at least one of a signal strength and signal quality.

3. The method according to claim 1, wherein the delay characteristic information at least one of represents and indicates at least one of:
mean delay;
delay spread;
delay distribution,
delay spread distribution;
delay spread range;
relative delay spread;
energy distribution; and
impulse response to received signaling.

4. The method according to claim 1, wherein delay characteristic information is based on measurement performed on reference signaling associated to a reference beam corresponding to the signaling beam the delay characteristic pertains to.

5. The method according to claim 1, wherein the selected signaling beams are signaling beams from a subset of the set of signaling beams fulfilling a delay characteristic criterion.

6. The method according to claim 1, wherein the number of subgroups in the plurality of subgroups is smaller than the number of wireless devices in the set of wireless devices.

7. The method according to claim 1, wherein communicating is based on setting one or more transmission parameters for each of the selected signaling beams.

8. The method according to claim 1, wherein communicating using the selected signaling beam comprises at least one of:
utilising a numerology; and
is based on at least one of an OFDM and a SC-FDM based waveform.

9. The method according to claim 1, wherein communicating comprises utilising a waveform with cyclic prefix.

10. The method according to claim 1, wherein wireless device are subgrouped into the plurality of subgroups based on at least one of:
one of a minimum and threshold delay characteristic; and
one of a minimum and threshold deviation of a delay characteristic.

11. The method according to claim 1, wherein the plurality of subgroups of wireless devices is based on beams assigned to wireless devices based on a delay characteristic criterion.

12. The method according to claim 1, wherein transmission parameters for a selected signaling beam are the same for each wireless device in the assigned subgroup of the plurality of subgroups.

13. A radio node for a wireless communication network, the radio node configured to:
obtain delay characteristic information for a set of wireless devices, the delay characteristic information for each of the set of wireless devices pertaining to one or more signaling beams of a set of signaling beams;
assign each wireless device of the set of wireless devices to at least one of a plurality of subgroups; and
communicate with the plurality of subgroups of wireless devices of the set of wireless devices using signaling beams selected from the set of signaling beams based on the delay characteristic information, for each subgroup, a different selected signaling beam being used for communicating.

14. The radio node according to claim 13, wherein the selected signaling beams are selected based on a beam signaling characteristic that at least one of represents and indicates at least one of a signal strength and signal quality.

15. The radio node according to claim 13, wherein the delay characteristic information at least one of represents and indicates at least one of:
   mean delay;
   delay spread;
   delay distribution,
   delay spread distribution;
   delay spread range;
   relative delay spread;
   energy distribution; and
   impulse response to received signaling.

16. The radio node according to claim 13, wherein delay characteristic information is based on measurement performed on reference signaling associated to a reference beam corresponding to the signaling beam the delay characteristic pertains to.

17. The radio node according to claim 13, wherein the selected signaling beams are signaling beams from a subset of the set of signaling beams fulfilling a delay characteristic criterion.

18. The radio node according to claim 13, wherein the number of subgroups of the plurality of subgroups is smaller than the number of wireless devices in the set of wireless devices.

19. The radio node according to claim 13, wherein communicating is based on setting one or more transmission parameters for each of the selected signaling beams.

20. A non-transitory computer storage medium storing a computer program comprising instructions that when executed causes processing circuitry to at least one of control and perform a method, the method comprising:
   obtaining delay characteristic information for a set of wireless devices, the delay characteristic information for each of the set of wireless devices pertaining to one or more signaling beams of a set of signaling beams;
   assigning each wireless device of the set of wireless devices to at least one of a plurality of subgroups; and
   communicating with the plurality of subgroups of wireless devices of the set of wireless devices using signaling beams selected from the set of signaling beams based on the delay characteristic information, for each subgroup, a different selected signaling beam being used for communicating.

* * * * *